No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 1.
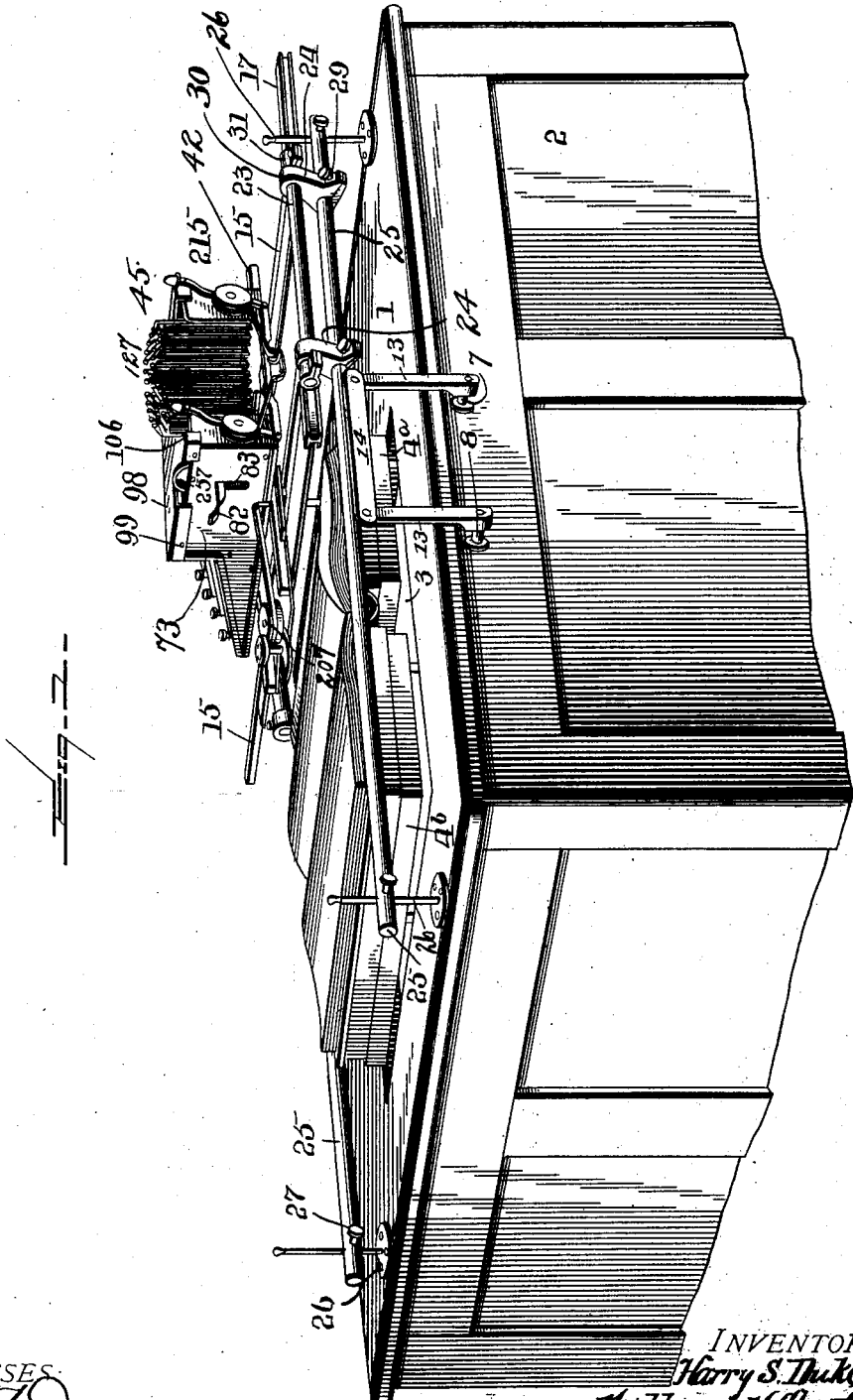

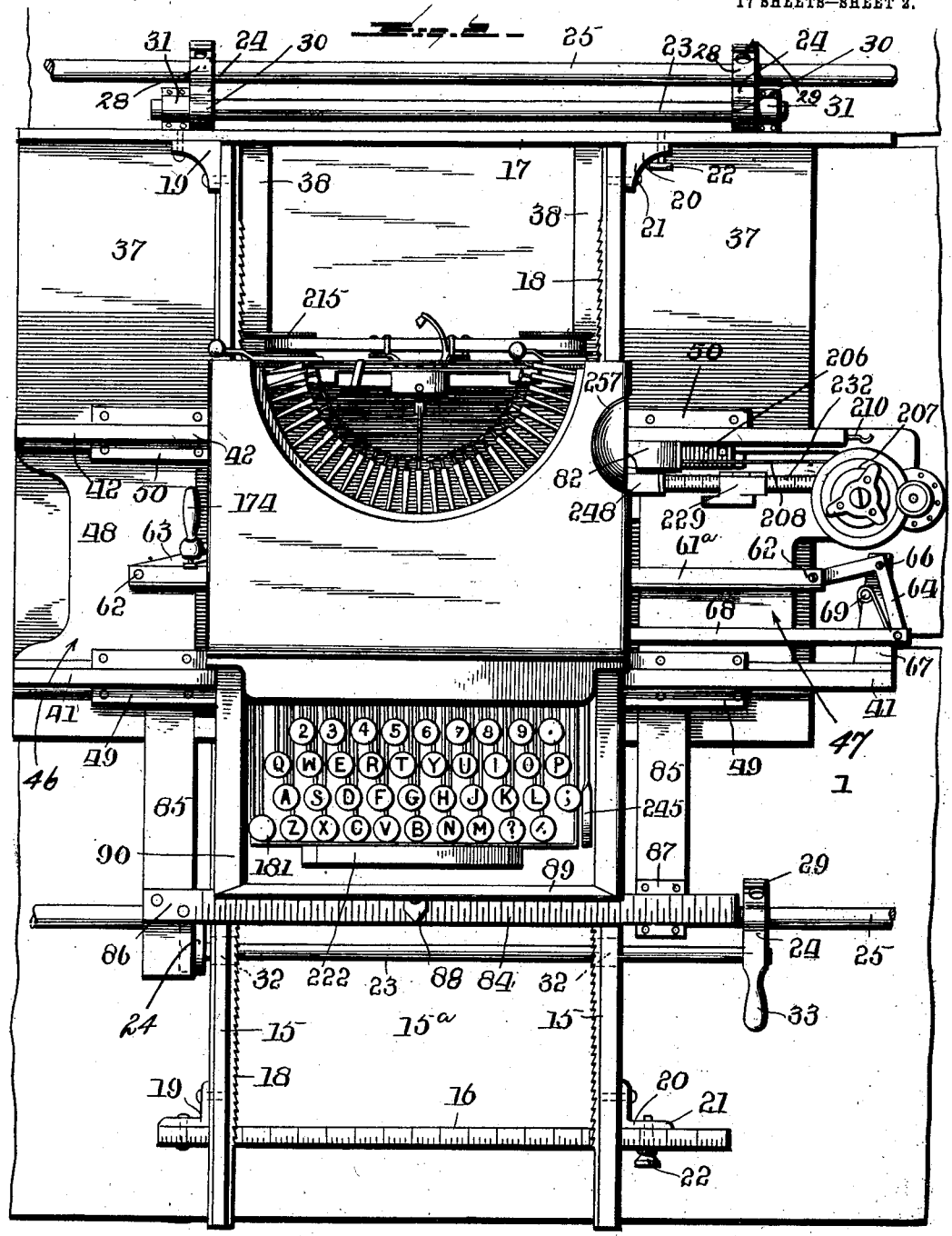

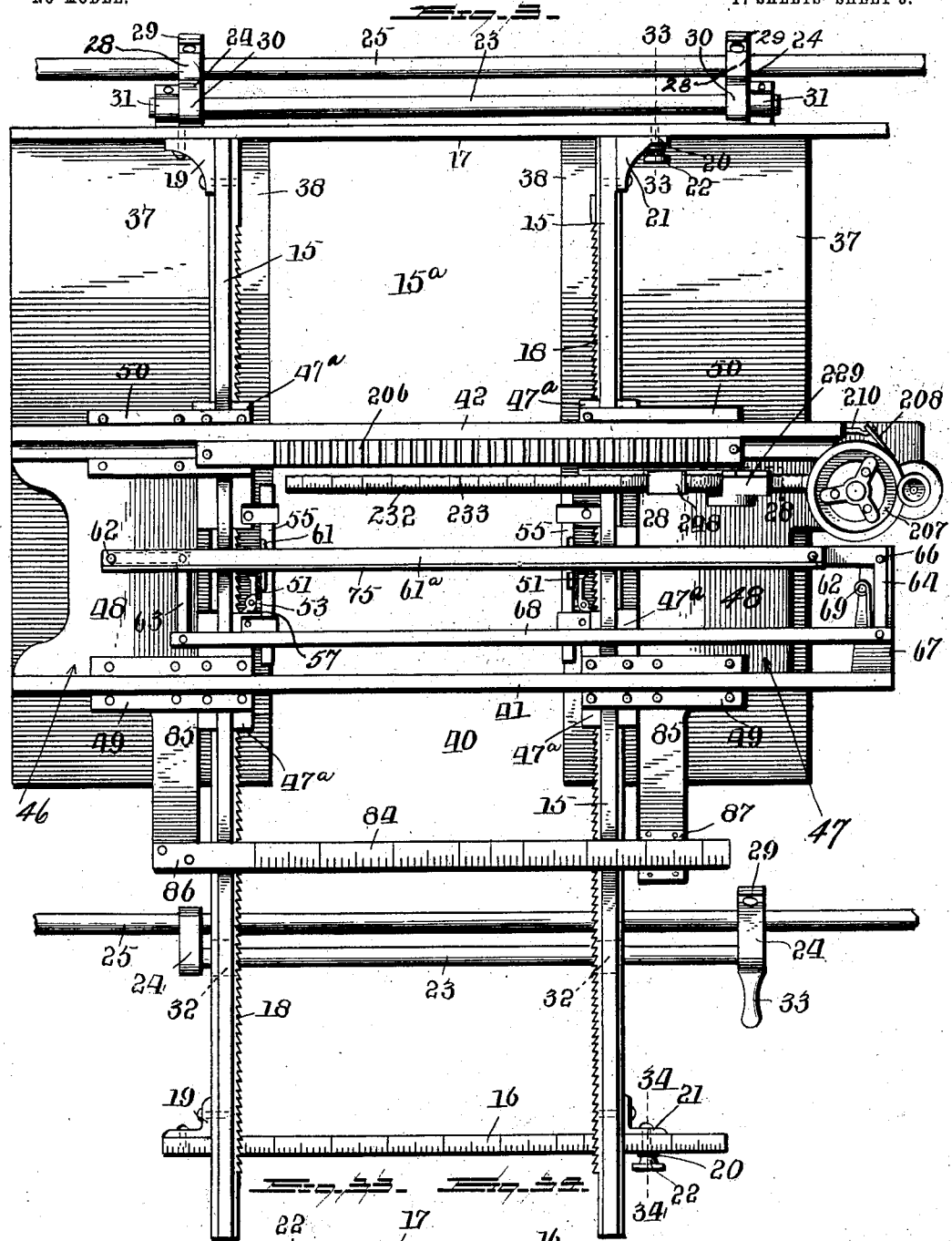

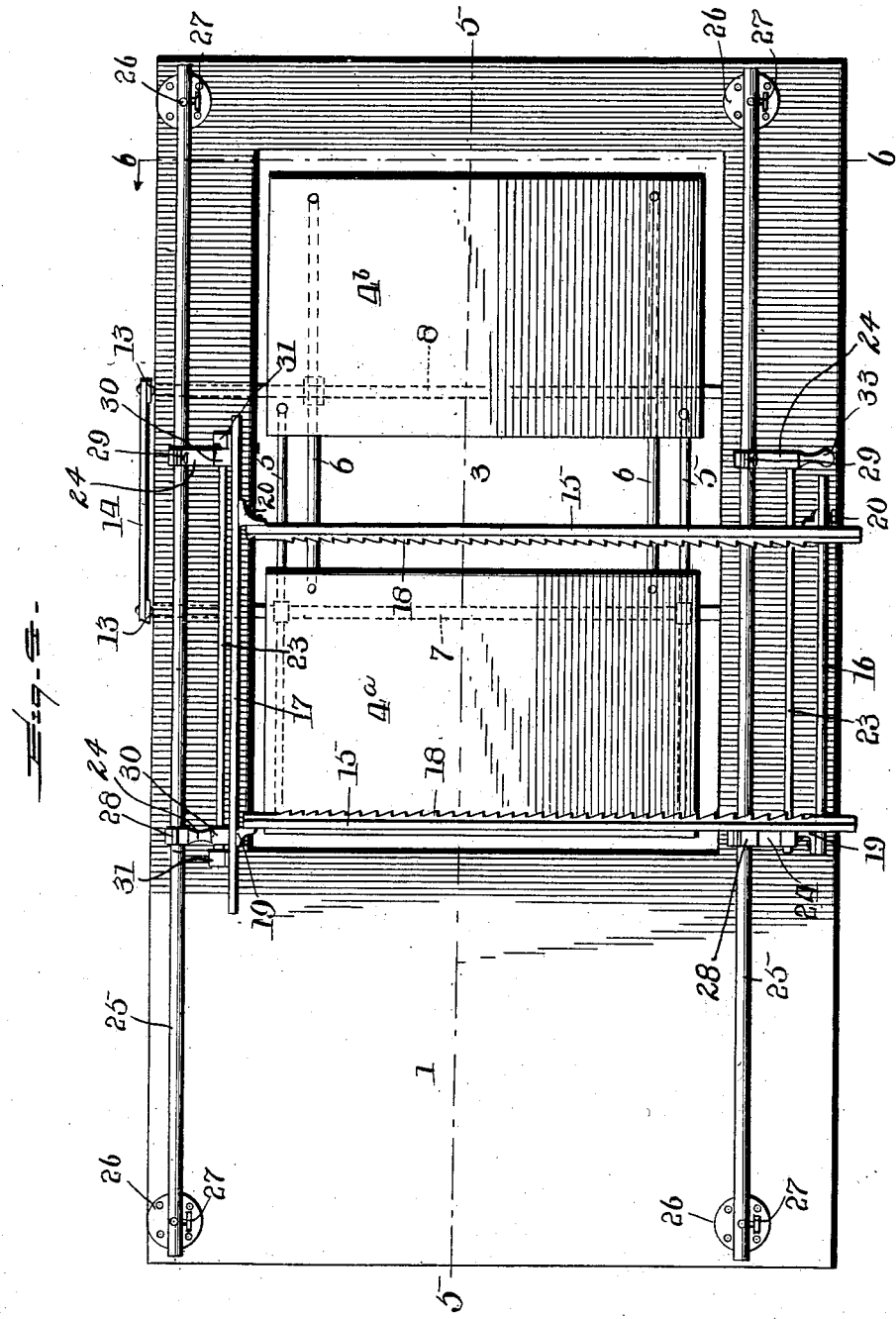

No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 5.
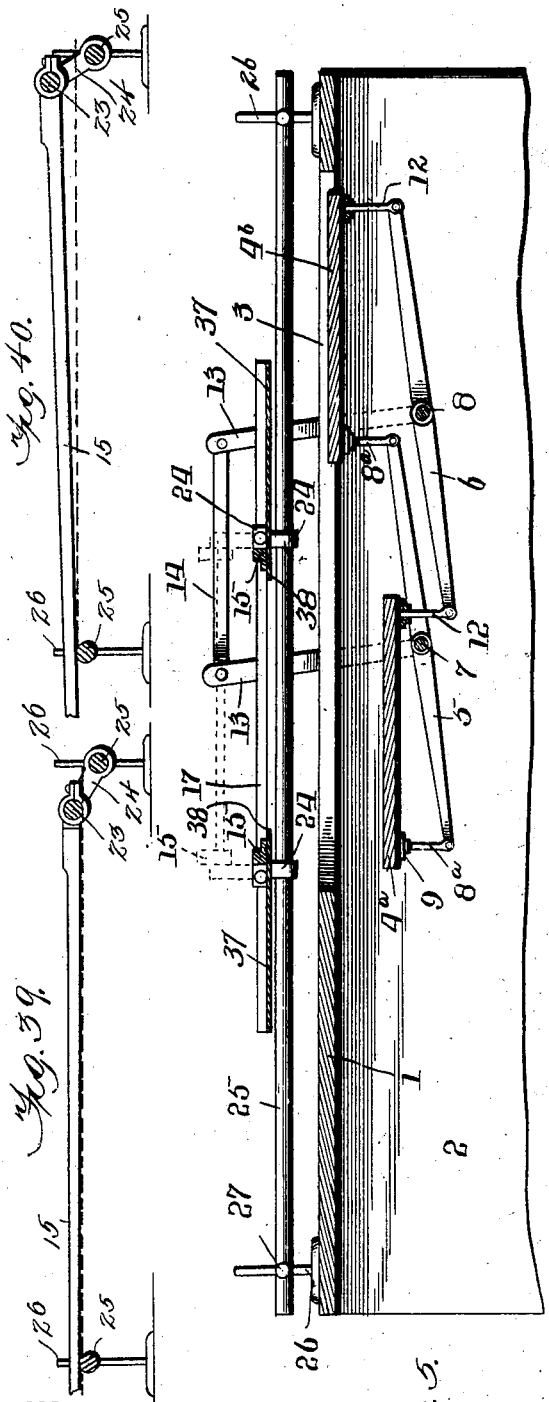
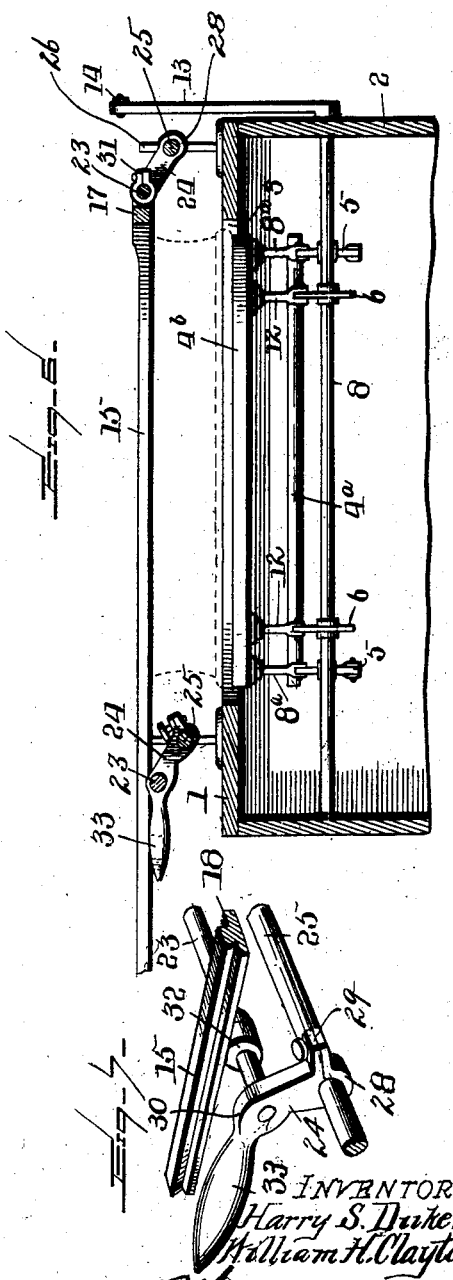
WITNESSES:
Wm. F. Doyle.
William F. Hall.
INVENTORS
Harry S. Dukes
William H. Clayton
BY D. T. Wolhaupter
Attorney

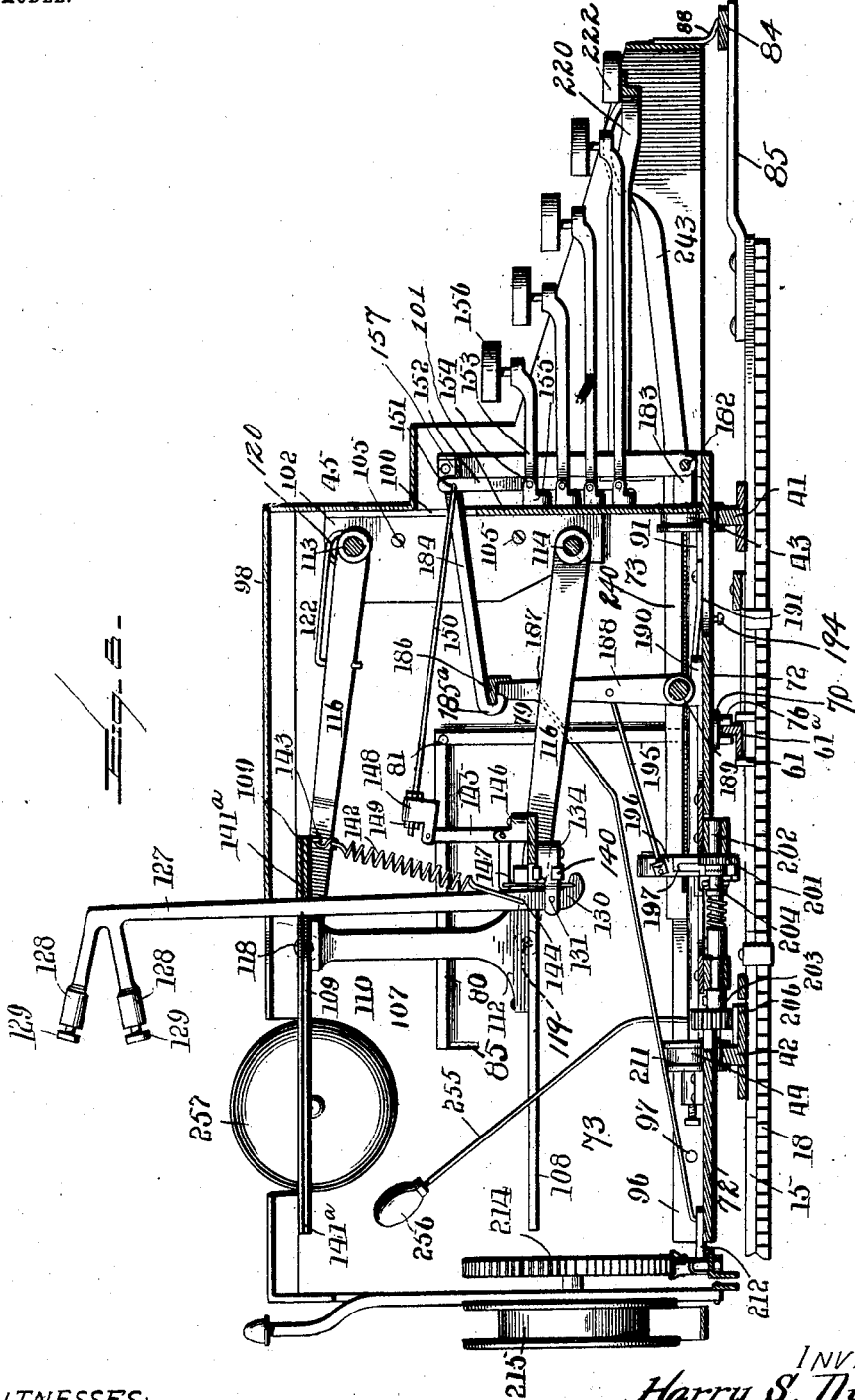

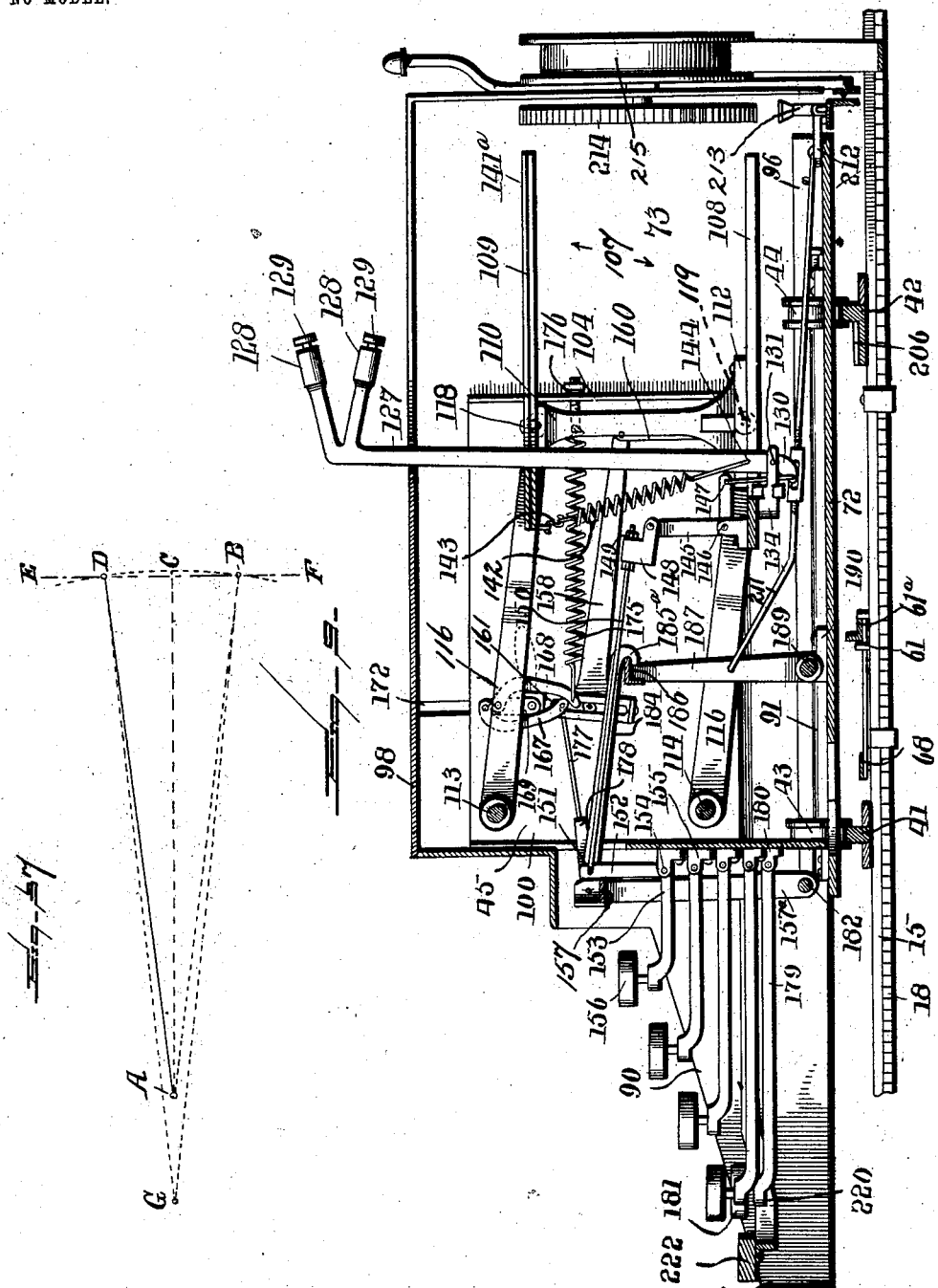

No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 8.
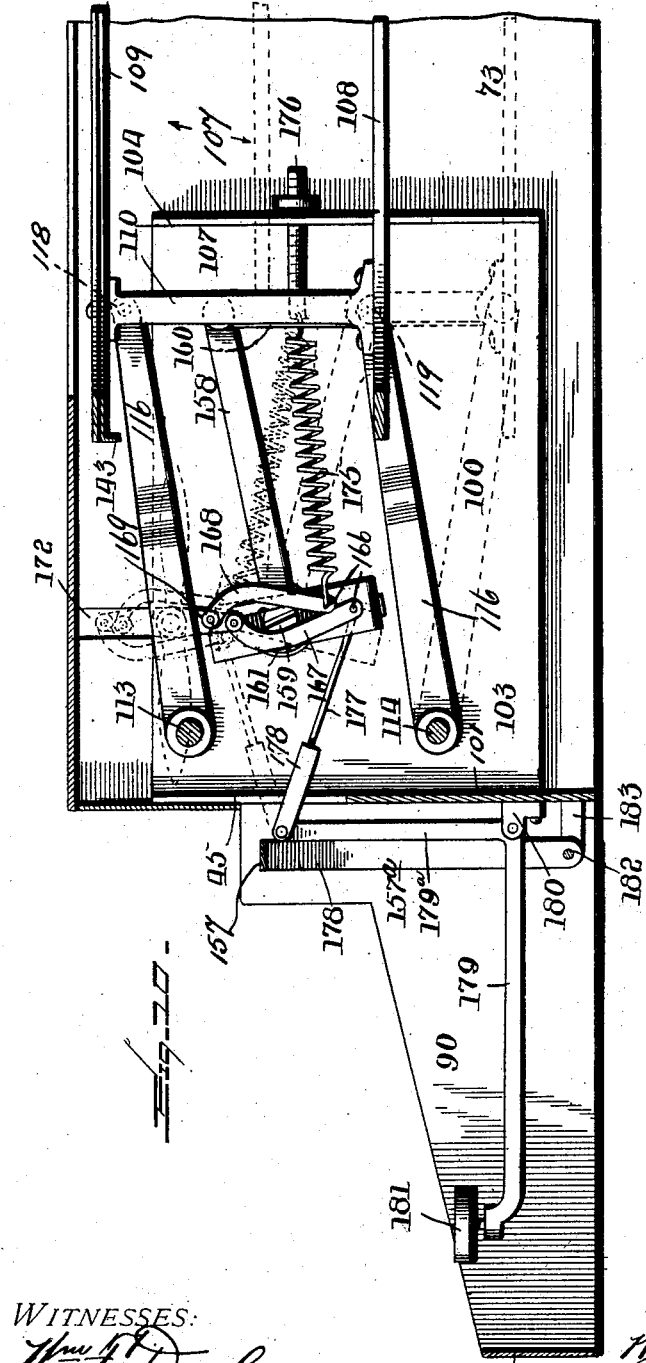
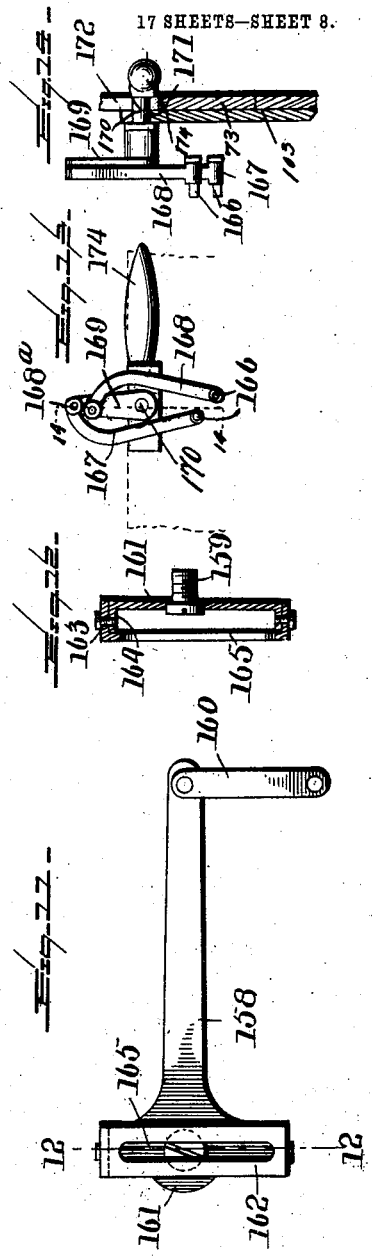
WITNESSES:
INVENTORS
Harry S. Dukes.
William H. Clayton
BY
Attorney No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 9.
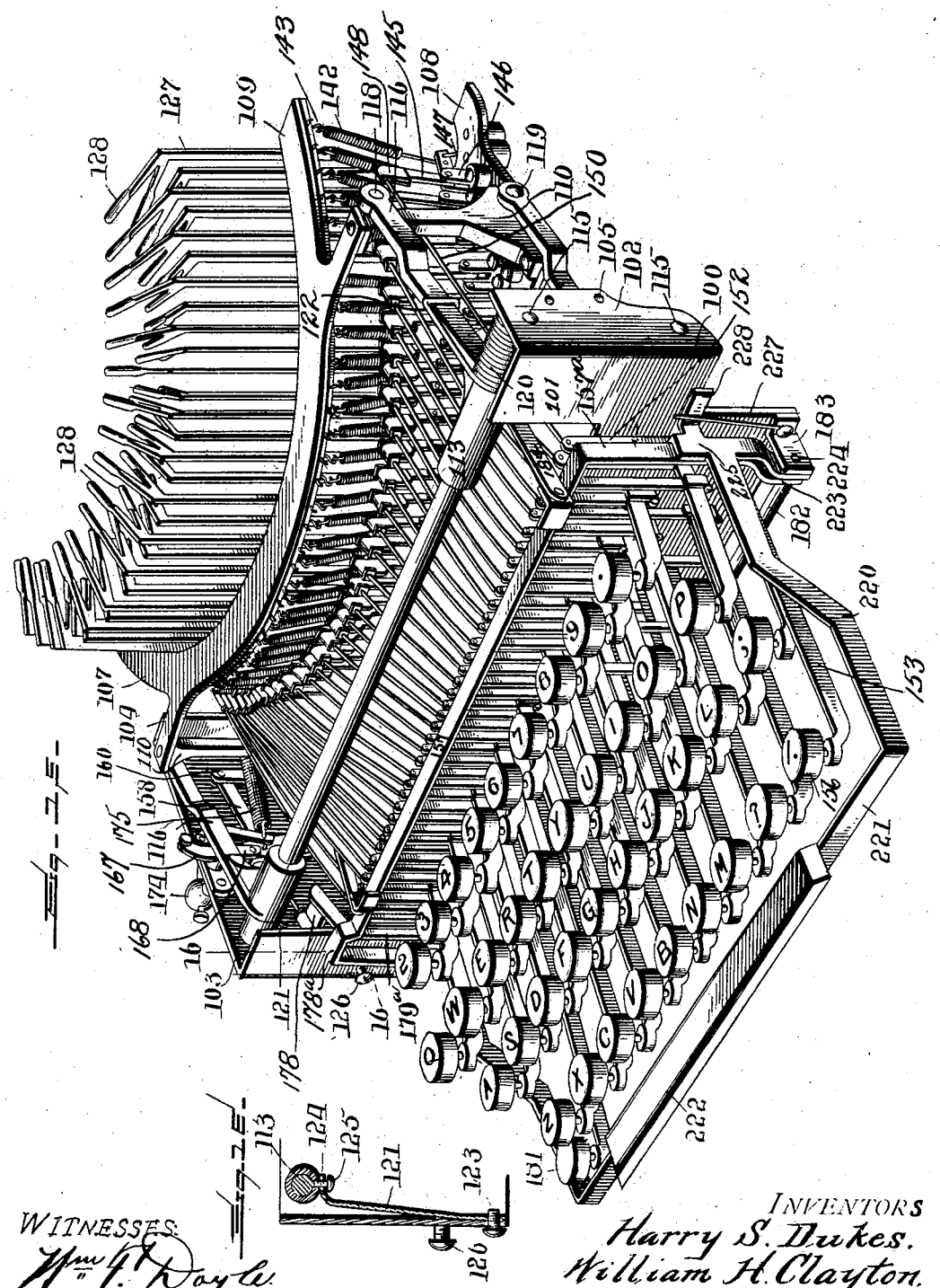
WITNESSES:
INVENTORS
Harry S. Dukes.
William H. Clayton.
BY
Attorney No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 10.
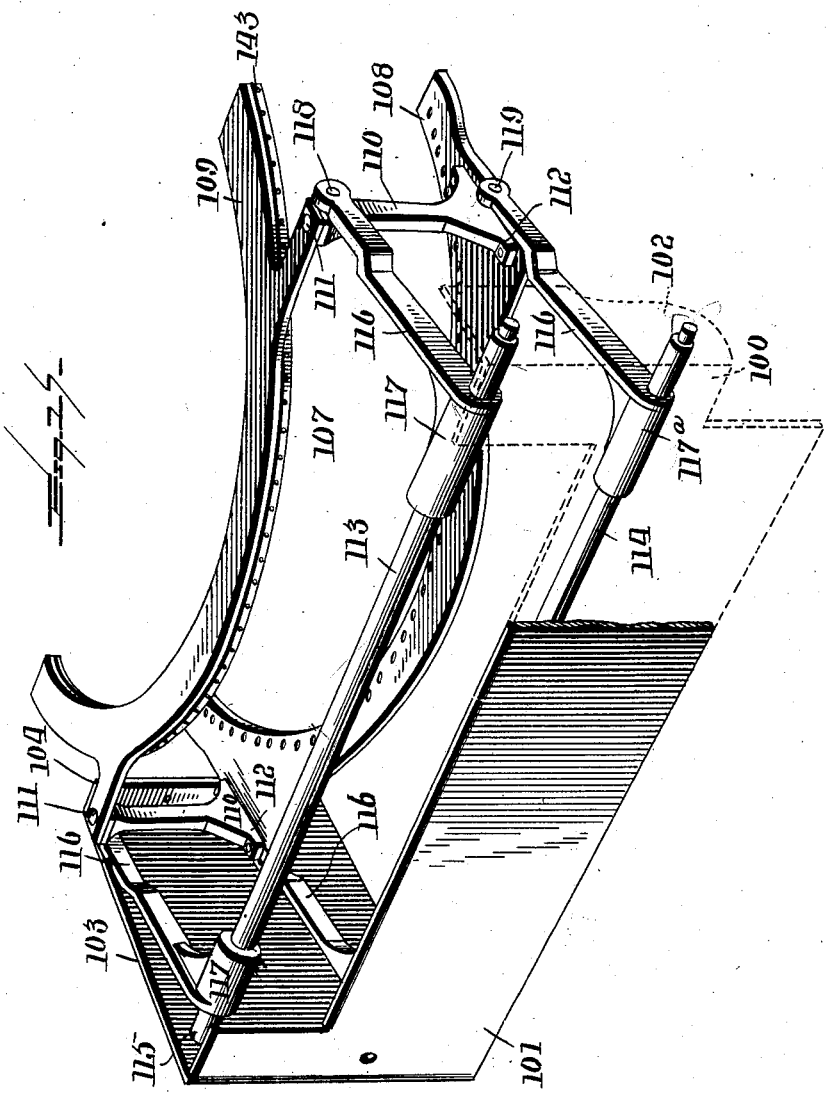
WITNESSES:
INVENTORS
Harry S. Dukes
William H. Clayton
BY
Attorney

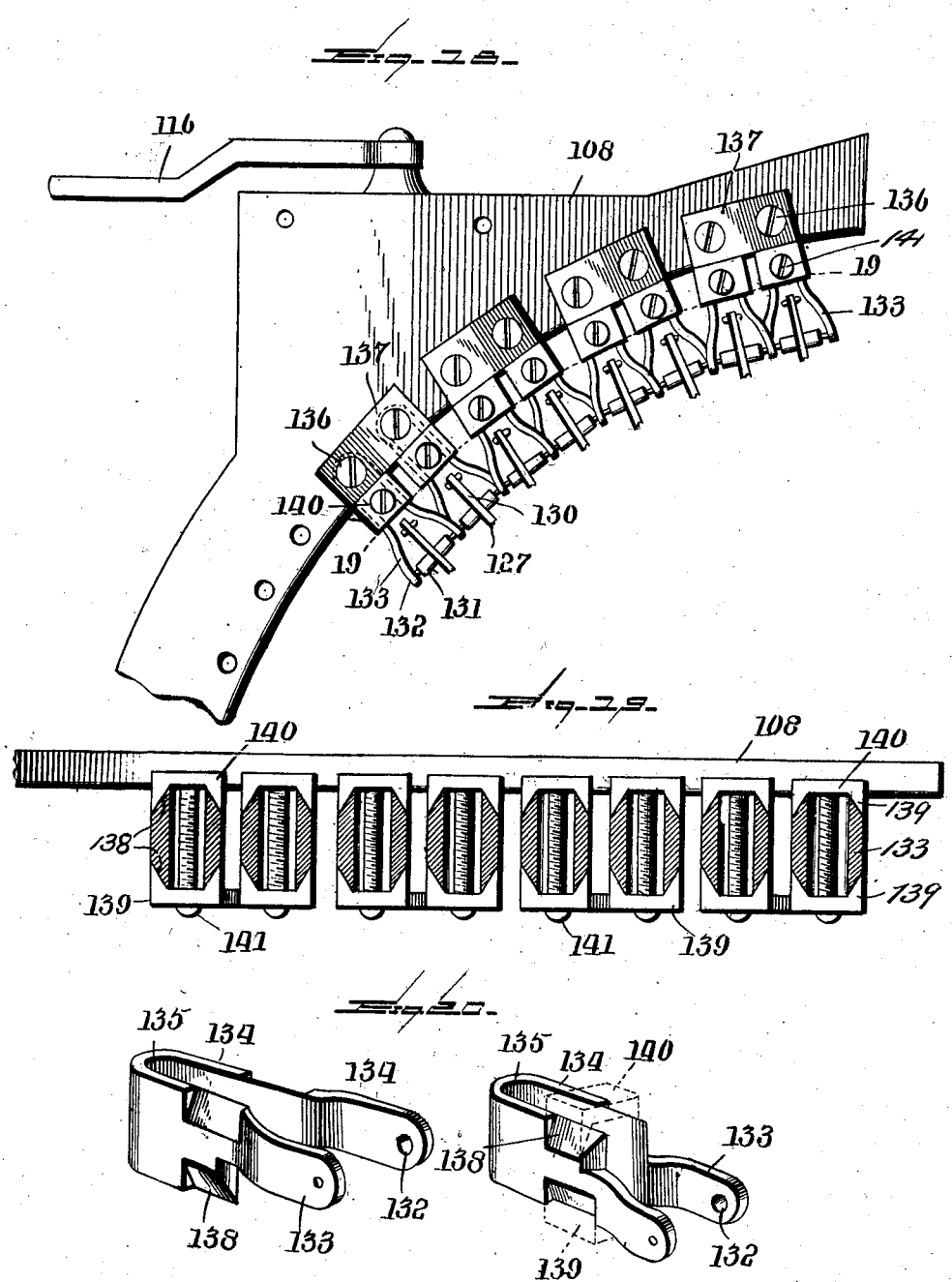

No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 12.
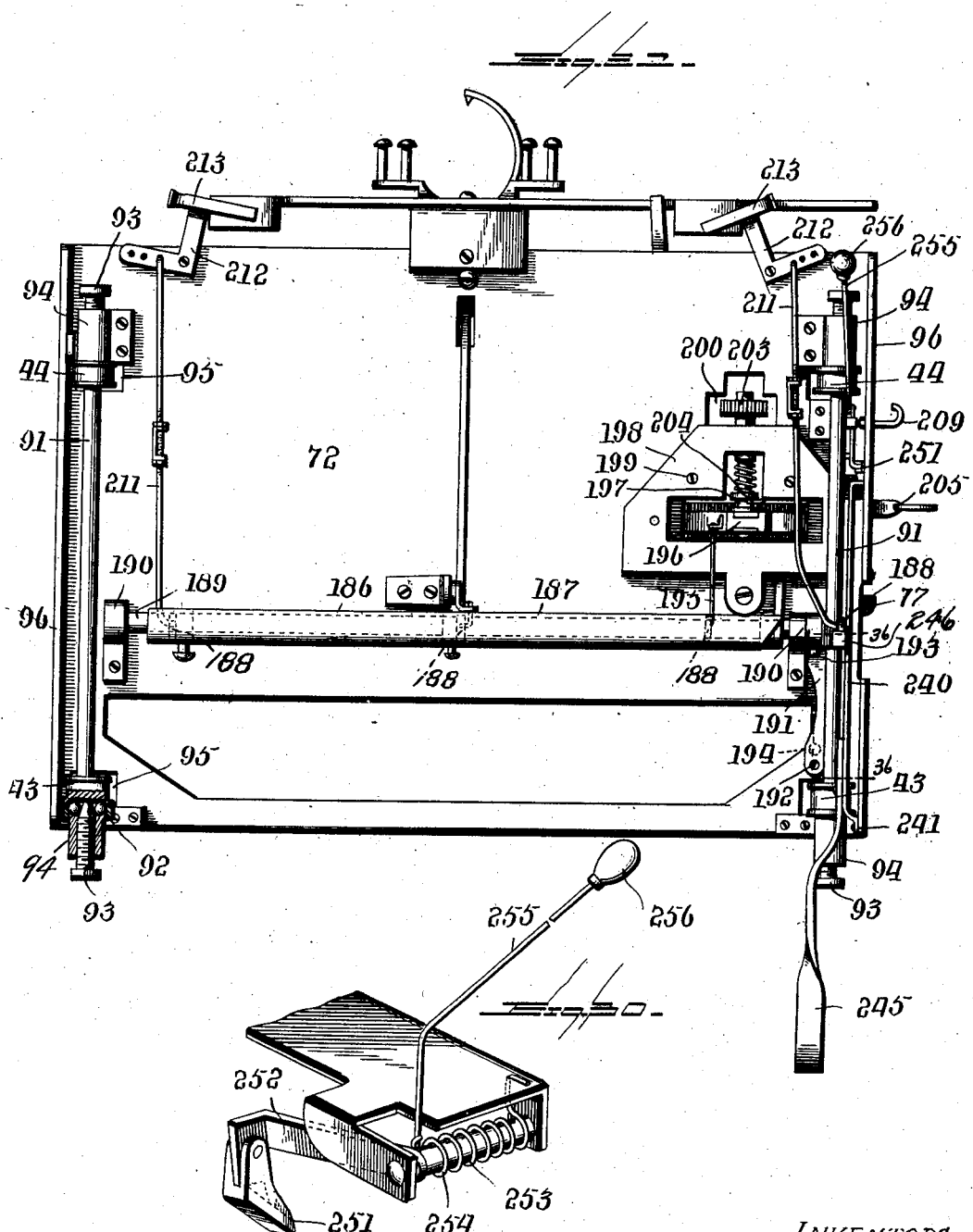

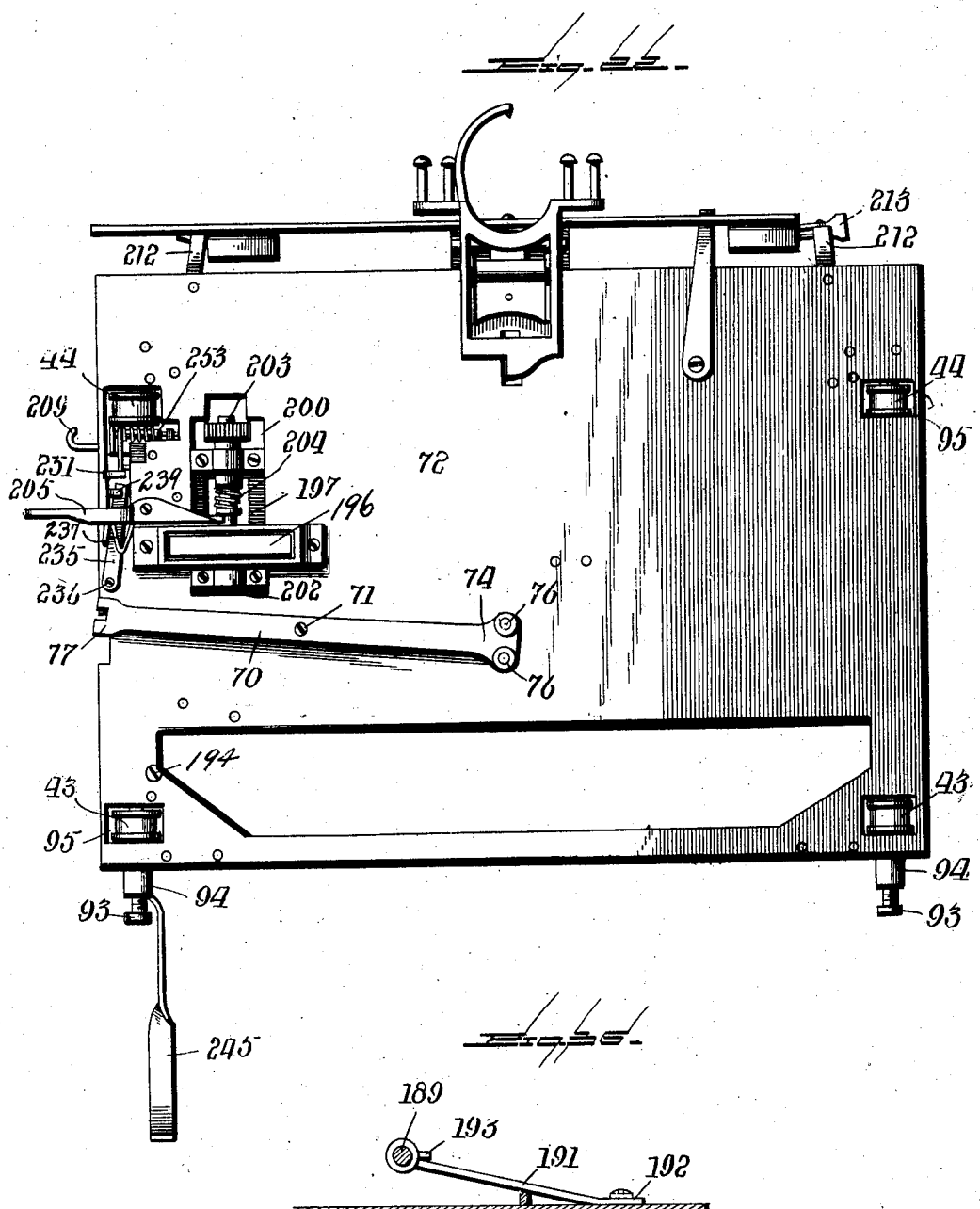

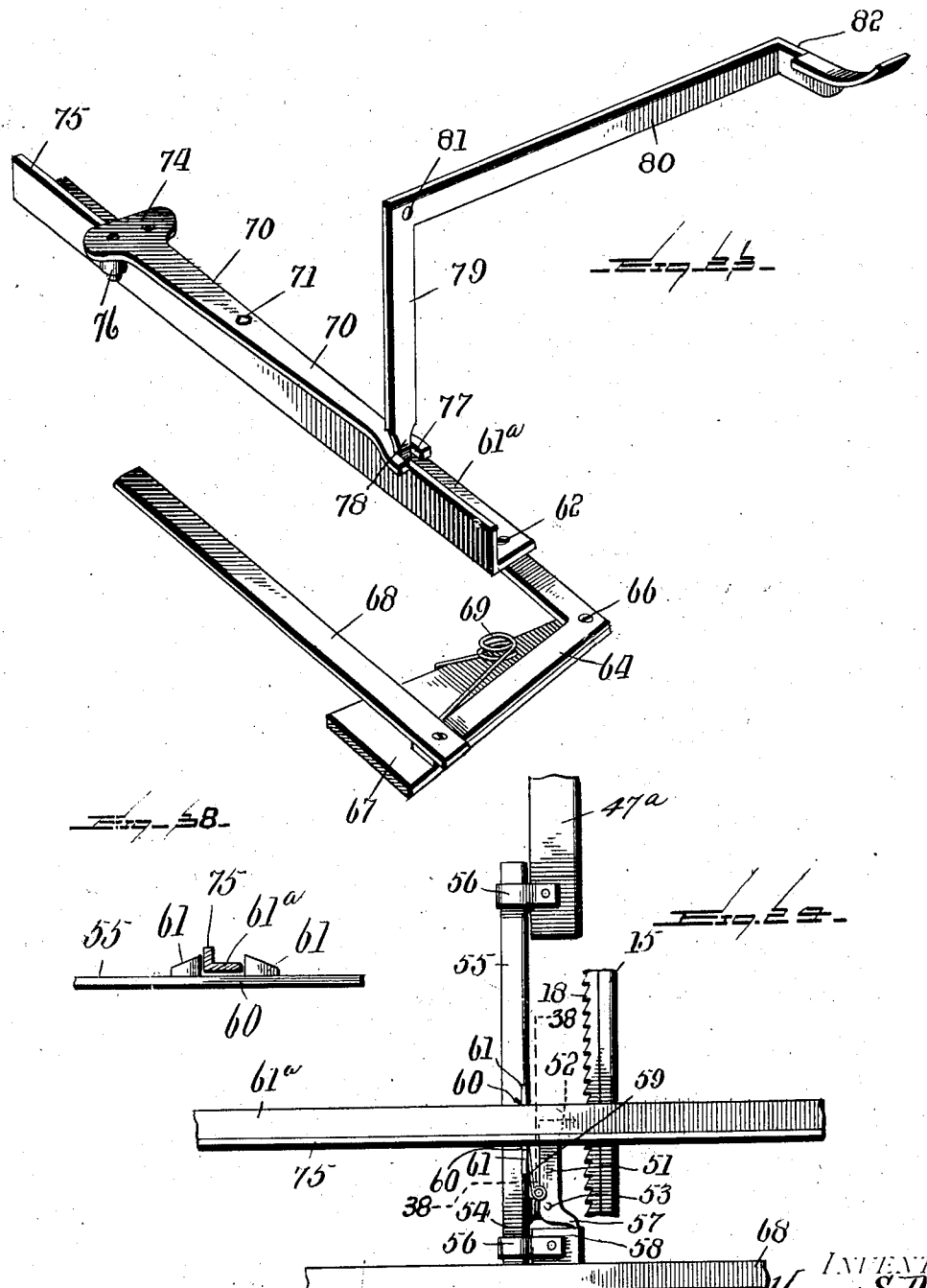

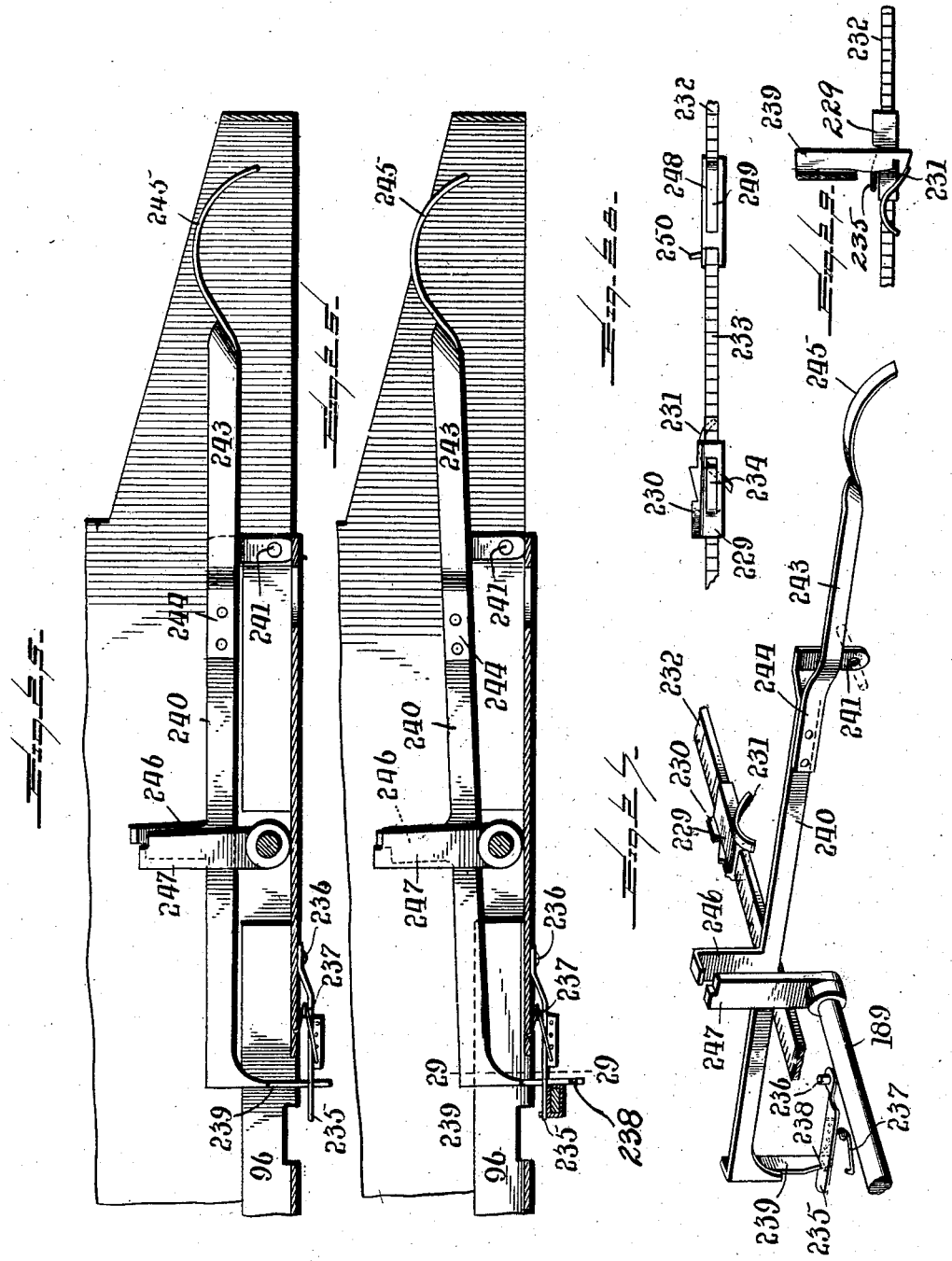

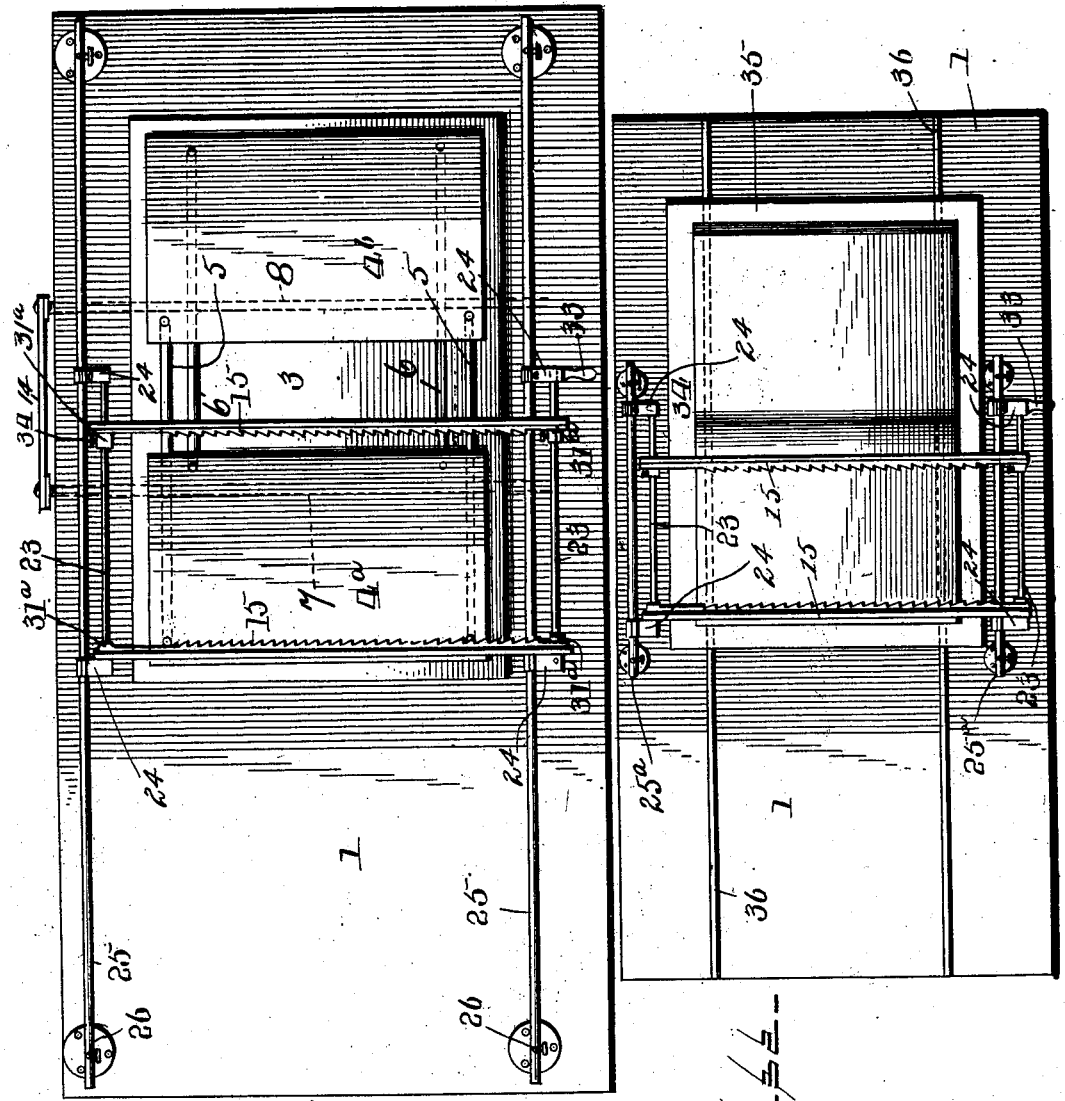

No. 753,788. PATENTED MAR. 1, 1904.
H. S. DUKES & W. H. CLAYTON.
TYPE WRITING MACHINE.
APPLICATION FILED NOV. 14, 1901.
NO MODEL. 17 SHEETS—SHEET 17.
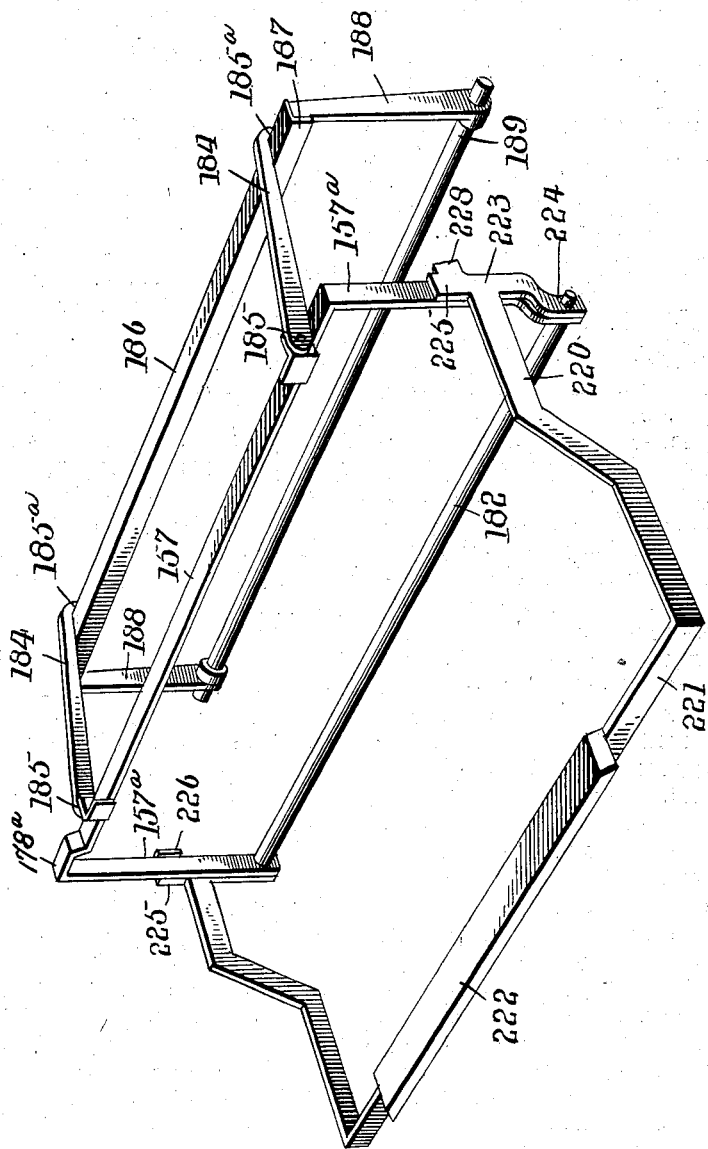
WITNESSES
INVENTORS
Harry S. Dukes.
William H. Clayton
BY
Attorney No. 753,788. Patented March 1, 1904.

UNITED STATES PATENT OFFICE.

HARRY S. DUKES AND WILLIAM H. CLAYTON, OF LITTLE ROCK, ARKANSAS, ASSIGNORS TO THE DUKES TYPEWRITER COMPANY, OF LITTLE ROCK, ARKANSAS, A CORPORATION.

TYPE-WRITING MACHINE.

SPECIFICATION forming part of Letters Patent No. 753,788, dated March 1, 1904.

Application filed November 14, 1901. Serial No. 82,228. (No model.)

*To all whom it may concern:*

Be it known that we, HARRY S. DUKES and WILLIAM H. CLAYTON, citizens of the United States, residing at Little Rock, Pulaski county, Arkansas, have invented certain new and useful Improvements in Type-Writing Machines, of which the following is a specification.

This invention relates to type-writing machines, and has special reference to that class of machines commonly known as "book typewriters," and comprising means for printing upon the pages of books or other surfaces held in a flat or spread-out condition.

Many of the improvements contemplated by the invention possess utility in type-writing machines generally; but as they are especially useful in the character of machines referred to all the improvements are illustrated and described in connection with a book type-writing machine having a printing mechanism capable of advancing lengthwise and also transversely of the work to effect the necessary line and letter spacing.

A general object of the invention is to provide a thoroughly practical and simple construction and arrangement of parts to permit of the easy manipulation of the machine and its various instrumentalities, while at the same time effecting accurate and neatly-alined printing and also presenting an arrangement of parts whereby the printing will be perfectly visible at all times and even the line of writing exposed except at the moment a character is being printed. In this connection the invention also has in view the provision of such a compact arrangement of the type-action and the key connections therefor as to insure the assembling of the machine parts in a very small compass and rendering it possible to provide a very low keyboard with a "dip" as low as commonly found in the ordinary type-writing machine.

A further object of the invention is to provide a number of detail structural improvements which admit of the machine being constructed with a minimum number of operating parts and of a comparatively small size and light in weight, all of which features are distinct and important qualifications of a book type-writing machine and the absence of which constitutes one of the present serious objections to such book type-writing machines as are now upon the market.

The above general objects of the invention are effected largely through special improvements upon the construction of book typewriting machine disclosed and covered in the former patent of one of the present applicants, said patent being numbered 671,186 and issued April 2, 1901.

One of the important improvements contemplated by the present invention resides in a novel type of main supporting-frame for the traveling printing mechanism and the track-rails therefor, whereby the same is capable of vertical adjustment not only for adaptation to the thickness of the book or other object being printed upon, but also for permitting the same to readily clear the work, whereby the frame and the entire mechanism supported thereon may be easily shifted or moved from one page of the book to the other, so as to bring the frame and the printing mechanism thereon over either page or moved entirely outside of the printing zone to permit of the convenient handling of the work and in the case of a book to permit of the free turning of the pages. An essential feature in this connection resides in the novel mounting of the main supporting-frame for the printing mechanism and the track for the latter, whereby the frame and the mechanism thereon may be bodily raised and lowered with a minimum effort on the part of the operator.

To this end the invention contemplates such an arrangement and relation of the supports for the main supporting-frame that such frame as an entirety may be elevated from the work by an independent bodily movement thereof. Specifically speaking, this part of the invention involves the synchronous raising and lowering of the front and rear ends of the supporting-frame while the latter remains in an approximately horizontal plane, and when thus elevated will be readily shiftable in a lateral or transverse direction, accordingly as the operator may desire. Also the supporting-frame part involves the provision of means whereby the rising-and-falling movement referred to may be accomplished independently of the adjustment of the main base-supports, the adjustment of which is only utilized where books of largely-varying sizes may be operated upon.

Another object of the invention is to associate with the main supporting-frame improved means for clamping the work properly in position, while at the same time permitting of the printing being carried very close to the edges of the longitudinal guides forming a part of the frame, and also an improved arrangement of parts is provided whereby the main supporting-frame slidably supports a track-carrier, which in turn carries the entire line-spacing mechanism, (excepting the actuating means therefor,) the actuating or impulse spring for the carriage or printing mechanism, the letter-spacing rack, the adjustable line-lock and bell-trips, and all related parts.

A further object of the invention is to effect an improvement in the line-spacing mechanism which is carried by the track-carrier and to so arrange the various elements of this mechanism as to insure a perfectly synchronous and positive action of the spacing-pawls, besides involving a novel mounting of these pawls which provides for the normal disengagement from the teeth of the guides, thus dispensing with the necessity of a releasing device to permit of the track-carrier and the printing mechanism thereon being freely moved back and forth on the guides, as set forth in the other patent referred to.

There is also contemplated an improvement in the means carried by the type-carriage for actuating the line-spacing mechanism carried by the track-carrier upon the main supporting-frame and also to effect a simple and practical mounting of the entire type-action, including the type-bar carrier and the key connections for the type-bars.

In connection with the type-action the invention provides an improved shifting mechanism, associated with novel reversing means, whereby not only upper and lower case characters may be readily printed during the manipulation of the machine, but the type-action may also be quickly and positively set for normally printing either upper or lower case characters and the same shift-key employed with the type-action set in either position.

Other objects of the invention reside in simplifying the construction of the line-lock and in a novel mounting of the line-lock trip, whereby the parts may be readily adjusted or set to positions to effect a locking of the type-action at any point desired within the printing-scale and also to effect a number of improvements in the detail construction and mounting of various other instrumentalities to assist in carrying out the general objects above specified.

With these and many other objects in view, which will more readily appear as the nature of the invention is more fully set forth, the same consists in the novel construction and peculiarly useful relation of the parts hereinafter fully described, illustrated, and claimed.

All of the special improvements of the invention are necessarily susceptible to a wide range of modification without departing from the spirit or scope of the same; but the preferred embodiments of the improvements and the preferred way of associating the different instrumentalities for use in a book type-writing machine are shown in the accompanying drawings, in which—

Figure 1 is a general perspective view of a book type-writing machine embodying the improvements contemplated by the present invention and shown shifted to position at one side of the work-holder, thus illustrating the ready adaptability of the supporting-frame and the mechanism carried thereby to be freely shifted to any desired position within or outside of the printing zone. Fig. 2 is a top plan view of a book type-writing machine, including its main supporting-frame, constructed in accordance with the present invention. Fig. 3 is a similar view with the type-carriage or printing mechanism removed from its track to expose the track-carrier and the various parts associated therewith. Fig. 4 is a top plan view with the type-carriage or printing mechanism and also the type-carrier removed from the main supporting-frame to illustrate more plainly the construction and mounting of this frame and its relation to the work-holder. Fig. 5 is a longitudinal sectional view on the line 5 5 of Fig. 4, showing more plainly the coöperative relation between the rest-tables of the type of work-holder which may be preferably employed in connection with the machine. Fig. 6 is a transverse sectional view on the line 6 6 of Fig. 4. Fig. 7 is a detail perspective view showing more clearly the operative relation between one of the base-rods, a vertically-swinging frame-carrying rod, a longitudinal side bar or guide of the supporting-frame proper, and a convenient operating means for the frame-supports. Fig. 8 is a longitudinal sectional view through the type-carriage, the view being somewhat skeletonized to plainly expose the type-action. Fig. 9 is a similar view of the type-carriage, illustrating one position of the shifting mechanism for the type-action to normally hold the type-bars in position for printing lower-case characters. Fig. 10 is a similar view showing the parts of the shifting mechanism adjusted to normally hold the type-bars in position for printing upper-case characters. Fig. 11 is a detail elevation of the shift-lever forming a part of the type-bar-shifting mechanism. Fig. 12 is a sectional view of the slotted head of said shift-lever on the line 12 12 of Fig. 11. Fig. 13 is a detail elevation of the reversing device associated with the shift-lever and also constituting a part of the typebar-shifting mechanism. Fig. 14 is a sectional view on the line 14 14 of Fig. 13. Fig. 15 is a perspective view of the entire type-action removed from the carriage-casing and illustrating all of the various parts and instrumentalities of such action carried by a single type-action frame. Fig. 16 is a detail sectional view on the line 16 16 of Fig. 15, illustrating one of the counterbalance-springs for the type-bar carrier, which spring is susceptible of adjustment to provide for a proper counterbalancing of the weight of the type-bar carrier and the parts sustained thereby. Fig. 17 is a skeletonized perspective view of the type-bar carrier and its supports. Fig. 18 is an enlarged detail bottom plan view of a portion of the hanger-ring for the type-bars, showing more plainly the mounting of the type-bar hangers and the relative positioning of the adjusting devices therefor. Fig. 19 is a sectional view on the line 19 19 of Fig. 18, showing the adjusting device for the type-bar hangers to provide for adjusting the bearings thereof. Fig. 20 is a perspective view of a pair of type-bar hangers, showing the reverse relation of the bearing cheeks or arms thereof to permit of compact grouping, one of the hangers having indicated thereon in dotted lines the oppositely-disposed adjusting-plates for the bearings. Fig. 21 is a top plan view of the detachable bottom plate of the carriage-casing, showing the several instrumentalities carried by such plate. Fig. 22 is a bottom plan view of the said bottom plate. Fig. 23 is a fragmentary perspective view of the operating devices for the line-spacing mechanism, showing the operative traveling engagement thereof with the spacing-bar of the portion of the mechanism carried by the track-carrier. Fig. 24 is an enlarged detail plan view of a portion of the line-spacing mechanism, showing more plainly the action of one of the spacing-pawls. Fig. 25 is a detail sectional view illustrating the line-lock in its normal unlocked position. Fig. 26 is a similar view showing the line-lock in the locked position which it assumes automatically at the end of the line being printed, said view also indicating the position of the adjustable line-lock trip carried by the track-carrier. Fig. 27 is a fragmentary perspective view of the entire line-lock, including the elements carried both by the carriage and also by the track-carrier. Fig. 28 is a detail sectional view indicated by the line 28 28 in Fig. 3 and showing one expedient for the adjustable mounting and holding of the adjustable line-lock and bell-trips on the trip-holding bar carried by the adjustable member of the track-carrier. Fig. 29 is a sectional view taken on the line 29 29 of Fig. 26, showing the operative relation of the line-lock elements to the line-lock trip when the trip-lever is engaged with the stop-shoulder of the trip and the pendent foot of the locking-lever is disposed in operative relation to the cam-piece ready to ride over such cam-piece on the return movement of the carriage. Fig. 30 is a detail in perspective of the bell-striking device which may be employed with the machine. Fig. 31 is a top plan view showing a modification of the main supporting-frame for the machine, in which the end bars in the preferred construction are dispensed with and the functions thereof are performed by the vertically-swinging frame-carrying rods which are carried by the front and rear swinging elements or links. Fig. 32 is another modification of the main supporting-frame, in which the frame as an entirety has a fixed position with relation to the work and the work-holder is shiftable. Figs. 33 and 34 are detail sectional views, respectively, on the lines 33 33 and 34 34 of Fig. 3. Fig. 35 is a skeleton perspective view of the common universal bar, illustrating more plainly the detachable latch connection between the same and the lever of the motion-transmitting element or rock-shaft and also the coöperation of the space-key yoke-lever connection with said universal bar. Fig. 36 is a detail sectional view on the line 36 36 of Fig. 21, showing more plainly the main tension-spring. Fig. 37 is a diagrammatic view illustrative of the movement of the type-bar carrier. Fig. 38 is a detail sectional view on the line 38 38 of Fig. 24, showing more plainly the open keeper of the plunger-stem which receives the spacing-bar of the line-spacing mechanism. Fig. 39 is a detail diagrammatic view illustrative of a modification which may be resorted to in the mounting of the main supporting or guide frame. Fig. 40 is a similar view of the same modification, showing a different position of parts.

Like numerals of reference designate corresponding parts in the several figures of the drawings.

In carrying out the present invention the different instrumentalities thereof involved in the construction and mounting of the main supporting or guide frame and also in the construction and mounting of the traveling printing mechanism and the track elements associated therewith may necessarily be utilized in connection with any suitable and practical type of work-holder; but inasmuch as great advantage is derived in a book typewriting machine from the employment of a work-holder comprising means for automatically maintaining the sheets or pages of a book at a common level or horizontal plane there is shown in the drawings for illustrative purposes a preferred form of work-holder for use in connection with the improvements claimed herein. This work-holder embodies several structural improvements, which impart to the same special utility over similar types of work-holders; but as these improvements are not specifically claimed in the present application a brief reference thereto is deemed sufficient for the purposes of the case.

The work-holder referred to of course is necessarily associated with a suitable type-writing-machine base 1. As illustrated in the drawings, this type-writing-machine base is preferably the table-top of a suitable typewriter cabinet or desk 2, but may necessarily be any type of base adapted for supporting the framework and the frame parts upon which the traveling printing mechanism is sustained. In connection with the form of work-holder shown in the drawings the base or table-top 1 is provided therein with an opening 3 of a greater size than the ordinary sizes of books designed to be operated upon by the typewriting machine and within which opening 3 is designed to play a pair of vertically-movable or rising and falling work-rests $4^a$ $4^b$. These work-rests $4^a$ $4^b$ are in the form of flat leaves or platforms arranged in spaced relation with a sufficient interval therebetween to accommodate the hub of the hook, whereby the opposite pages of a spread-open book will respectively rest upon the oppositely-located rests $4^a$ $4^b$. The latter are designed to be positively coupled or yoked together in such a way as to permit of the automatic rising and falling thereof, according to the weight of the pages thereon, while at the same time insuring a synchronous movement or adjustment of the two rests, respectively, in opposite directions, whereby the book will automatically level itself and bring both pages into a common horizontal plane. The preferred means employed for thus coupling or yoking together the synchronously-movable work-rests $4^a$ $4^b$ are shown in the drawings, and essentially consist of separate sets of leveling-levers associated with both work-rests $4^a$ $4^b$ and also having an equalizing connection to insure absolute synchronism in the movement of the parts. The separate sets of leveling-levers are designated, respectively, by the reference-numbers 5 5 and 6 6, said levers being respectively mounted fast upon rocking supports 7 and 8, preferably in the form of rock-shafts extending beneath the oppositely-located rests $4^a$ $4^b$ and journaled in suitable bearings in the frame or cabinet part of the base 1.

For convenience in setting forth the proper relation of parts of the work-holder the separate work-rests have been designated, respectively, by the reference characters $4^a$ $4^b$. As illustrated, the pair or set of leveling-levers 5 5 are mounted upon the rocking support or shaft 7 intermediate their ends, said rocking support or shaft 7 being located beneath the rest $4^a$. At one end the oscillatory leveling-levers 5 5 have pivotally connected thereto the carrying-links $8^a$, which are in turn suitably connected, as at 9, to the work-rest $4^a$ at or contiguous to the outer edge of said rest, while the opposite ends of the levers 5 5 have similar link connections with the other work-rest $4^b$ at or contiguous to the inner edge thereof. The other set of leveling-levers 6 6 are associated with the rocking support or shaft 8 beneath the work-rest $4^b$, and at one end the said levers 6 6 have the link connections 12 with the rest $4^b$ at or contiguous to the outer edge thereof, and at their opposite ends have similar link connections with the other rest $4^a$ at or contiguous to the inner edge of the latter, thus completing duplicate sets of connections between the leveling-levers and the two work-rests. To insure the synchronous action of the parts referred to, the rocking supports or shafts 7 and 8 have connected thereto, conveniently at one extremity thereof, the upstanding shaft-arms 13, which are pivotally united together by an intermediate connecting-bar 14. In regard to the links $8^a$ and 12 it is of course understood that while the same have a pivotal connection with the leveling-levers the connection with the rests is of such a nature that the necessary play of the links is permitted, while at the same time they are maintained in a practically vertical position.

From the foregoing construction it is obvious that the inner and outer edges of both work-rests $4^a$ $4^b$ are maintained in true horizontal planes and that the said rests will rise and fall in true synchronism, inasmuch as the connections 13 and 14 insure the simultaneous and similar movement of both sets of leveling-levers, although by reason of the opposite locations of said levers and their reversed connections one work-rest will fall while the other rises to adjust themselves to a book placed thereon. When a book is placed in position upon the work-holder and thrown open, the separate rests will adjust themselves to the weight thereon. In other words, an automatic leveling of the work is insured, and in explanation of the action involved it may be briefly stated that as the two sides of the book are connected by a "hub" the moment the rest which sustains the lighter weight tends to rise above the point where the opposite pages are leveled the weight of the book is brought against the inner edge of such rest, which, however, is in balance with the outer edge of the opposite rest. Therefore these two edges of the opposite rests—*i. e.*, the inner edge of one and the outer edge of the other—will come to a level at the point where the weight upon the two edges is the same. As the rests must remain horizontal, the practical effect is to keep the pages of the open book in the same horizontal plane. This is of very great advantage in book-type-writing machines, inasmuch as the opposite pages of an open book will always be level and maintained in the same plane, so that a machine may be readily shifted from one page of the book to the other during the printing operation without the necessity of readjusting the work after one page of the book has been completely printed upon.

The printing-plane will necessarily vary according to the thickness of the book to be printed upon; but the present invention involves as one of the important features thereof a supporting or guide frame which can be accommodated to any thickness of book, while at the same time being capable of convenient and ready elevation when it is necessary to raise the same from the work for any purpose—as, for instance, in shifting the entire mechanism from the printing zone of one page to the other or, in fact, entirely outside of the printing zone when the work is being either placed in position or removed from the work-holder. The novel features embodied in the supporting-frame for the printing mechanism and its track will now be particularly pointed out.

The supporting-frame proper for the traveling printing mechanism and its related parts is termed in the other patent aforesaid the "track - carrying" frame, inasmuch as the track-rails are carried thereby, although it is understood that the frame is well known in the art as the main supporting-frame for the entire printing mechanism and the parts which have a traveling movement to effect both line and letter spacing; but in order that the novel manner of manipulating and sustaining the said supporting-frame may be better understood and sharply emphasized the said frame will be termed herein the "guide-frame," as it comprises in its general organization of parts the longitudinal guides upon which the track - carrier or track - carrying platform slides in the line-spacing movement.

The guide-frame as an entirety is not substantially different from the corresponding supporting or track-carrying frame described in the patent aforesaid and embodies means whereby the transverse width of the frame may be adjusted to suit the width of the sheet or page being printed upon without disconnection of the side and cross bars constituting the frame and also without disturbing the track-rails sustained upon the frame. This is one of the distinctively novel features set forth and claimed in the Dukes patent, No. 671,186, and is also illustrated in the present case to bring out the novel combination of features in connection with the guide-frame, which greatly add to the practical utility of the entire book type-writing machine forming the subject-matter of the present application and a necessary part of which machine is a guide or supporting frame for sustaining the traveling printing mechanism in operative relation to the work while permitting of line-spacing and letter-spacing in the most effective and positive manner.

In the preferable forms of the invention the guide-frame essentially consists of a pair of parallel longitudinal guides or guide-bars 15 and oppositely-located parallel front and rear end bars 16 and 17, respectively, which connect the opposite end portions of the longitudinal guides 15, and thereby form the complete frame, which, in short, consists of connected side and cross bars. The guides or guide-bars 15 are disposed longitudinally of the page or sheet being printed upon and may also serve when lowered to assist in holding the page or sheet in a flat or spread-out condition, it of course being understood that should it be desired or found necessary the proper backing for the sheet or page may be provided for by using any suitable type of flat platen, although such platen when used is entirely separate from the machine or any of the supporting elements thereof and can be readily removed and inserted without affecting or disturbing any part of the machine or its support. As the use of a separate platen of this character is well known in the art, it has not been deemed necessary to disclose the same in the drawings. The said longitudinal guides 15 are provided along their inner longitudinal edges with a series of ratchet-teeth 18, designed to be engaged by the spacing-pawls of the line-spacing mechanism hereinafter described, and referring more particularly to the frame as an entirety and the means for supporting the same it is to be observed that in the preferable construction the members of the frame—namely, the connected side and cross bars—are so related or assembled that the transverse width of the frame may be adjusted to accommodate the same to different widths of pages or sheets to be printed upon, and while this may be accomplished by the transverse adjustment of either one or both of the guides 15 the preferred embodiment of this feature of the frame is disclosed in the present drawings, as well as in the Dukes patent aforesaid, and consists in having a rigid connection between the left-hand guide 15 and the cross-bars 16 and 17 of the frame, while the right-hand guide 15 has a slidable connection with the said cross-bars to permit of its being moved toward and from the left-hand guide, whereby the width of the frame as an entirety may be varied to suit the conditions of the work. In the practical operation of the machine it is unnecessary for the left-hand guide to be adjustable, as the same is designed to rest upon the page or sheet contiguous to the left-hand edge thereof, and consequently the most available way of effecting a transverse width adjustment of the frame is to have the right-hand guide 15 transversely adjustable. Any suitable expedients may be resorted to for carrying out this important feature in the make-up of the guide-frame; but in the drawings a simple construction is shown and consists in rigidly uniting the left-hand guide 15 with the front and rear cross or end bars 16 and 17 by means of angle-irons or blocks 19, screwed or riveted fast to the left-hand guide 15 and also to the contiguous portions of the front and rear cross-bars 16 and 17, while the right-hand and adjustable guide 15 has adjustable connections 20 at its opposite end portions, respectively, with the separate cross-bars 16 and 17. These adjustable connections may consist of any suitable mechanical expedient—such, for instance, as shown in the drawings—in which the said connections embody angle-irons or blocks 21, made rigid with the right-hand guide 15 and having a slidable interlocking engagement with the bars 16 and 17, besides carrying clamping screws or devices 22, engaging the said angle-irons or blocks 21 and also the cross-bars 16 and 17 for holding the right-hand guide rigid or fast in its adjusted position. The slidable interlocking engagement between the angle-irons or blocks 21 and the cross-bars 16 and 17, as well as the engagement of the clamping-screws 22 with the cross-bars and angle-irons, is plainly shown in detail, Figs. 33 and 34 of the drawings; but it is of course understood that no claim is made herein to these adjustable connections, as any means may be resorted to for effecting a transverse adjustment of either or both of the guides to effect a transverse width adjustment of the entire frame.

One of the distinct improvements resides in the manner of handling the guide or supporting frame to provide for its elevation from the work, as well as the convenient shifting thereof from one page to the other of the book or to a position entirely outside of the printing zone. This improvement consists, broadly speaking, in providing an elevating-support for the guide-frame independent of the main adjustable supports on the base and which elevating-support comprises means for the raising and lowering of the framework while approximately in a horizontal position, and the preferred construction also provides means whereby the frame in its elevated position above the work can be freely shifted from one position to another over separate pages of a book or to a point entirely outside of the printing zone. In this connection the invention also contemplates a guide-frame or type-writing-machine support having a bodily rising-and-falling arcuate movement as an entirety and which may be elevated from the work by an independent lateral movement thereof—that is, through a movement caused by an endwise or sidewise pressure—in contradistinction to the vertically-swinging movement of type-writing-machine supporting or guide frames heretofore used in connection with book-type-writing machines. In this type of vertically-swinging frames most of the same have a regular hinge action—that is, have a hinge-support at one end, while the other end is swung up vertically from the work, so it will be understood that the present invention contemplates an elevating-support for the guide-frame, whereby both ends may be simultaneously elevated above the work, and the frame as an entirety in the preferred construction may be shifted laterally to any position desired upon the main supports carried by the base.

In describing the rising-and-falling movement of the guide-frame or type-writing-machine support, this movement is accurately referred to as a "bodily rising-and-falling arcuate" movement, inasmuch as the frame necessarily moves through an arc during the rise and fall thereof; but at the same time there is a further distinction over the prior art, particularly in the manner in which the frame is manipulated or moved to effect the elevation from the work. That distinction resides in what may be properly characterized as a substantially "parallel motion" for the guide-frame itself. This substantially parallel motion of the guide-frame in reference to the base necessarily involves a movement for the guide-frame, which may not only be said to be reciprocatory, inasmuch as on one stroke or movement the frame rises and on the other it falls or lowers, but also in a broad sense in each of the aspects above indicated the elevation of the guide-frame is effected through an independent lateral movement of the frame itself.

The term "lateral" is used in its broad significance and is not intended to apply to the direction of movement, but to the character of movement, irrespective of whether the same is in an endwise or sidewise direction, said lateral movement differentiating the present invention very definitely from the frames having a vertically-swinging movement, such as already referred to, and also from type-writing-machine-supporting frames of the character which only have a true vertically up-and-down movement or adjustment upon adjustable supports sustaining the same.

Various mechanical expedients may be resorted to in the construction of an elevating-support capable of adjusting the guide-frame in the manner set forth; but a practical as well as simple type of elevating-support is shown in the drawings, and essentially consists of front and rear frame-elevators consisting of horizontally-arranged elevating-rods 23 and vertically-swinging supports 24, carrying the said rods, and in turn mounted upon the main base or supporting rods 25. These rods 25 are arranged above the base 1 contiguous to the front and rear edges thereof and vertically adjustable upon the holding-standards 26, mounted upon the base 1 and slidably receiving the end portions of the rods 25, which are held in any vertically-adjusted position upon the standards by the set-screws 27 or equivalent fastening devices. At this point it should be explained that while the main base or supporting rods 25 are vertically adjustable, still such adjustment is only utilized when books of greatly-varying thickness are placed upon the work-holder, inasmuch as the vertically-swinging elevating-supports for the guide-frame will compensate for the different elevations of books of the ordinary sizes.

The main base or supporting rods 25 are non-rotatable, and therefore constitue pivotal supports for the vertically-swinging supports 24 of the front and rear elevators for the guide-frame, and in the preferable construction the vertically-swinging supports 24 are in the form of short links or arms, provided at one end with pivot-collars 28, loosely turning upon the main base-rods 25, and also having a free sliding engagement therewith, so as to permit of the ready shifting of the frame-elevators and the guide-frame carried thereby transversely over the work or to a position at one side of the work, and in the construction shown certain of said pivot-collars 28 may be of the split type and provided with clamping means 29 for holding the same fast upon the base-rods 25 after the parts have been once adjusted and it is desired to have the entire framework perfectly rigid during the manipulation of the printing mechanism. It should be understood that this is only one of many ways of connecting the swinging supports or links 24 with the base-rods 25, as the essential feature of this construction resides, first, in a pivotal engagement of some form between the said swinging supports and the rods 25, and, second, in the preferable forms of the invention of a sliding, traveling, or running engagement of some kind between the said supports 24 and the rods 25. One expedient has been deemed sufficient to illustrate this feature of the invention, and in the preferred construction (shown in Figs. 3 and 4 of the drawings) the swinging supports or links 24 are also provided at the ends opposite their pivotal support upon the rods 25 with the rod collars or openings 30, in which are tightly fitted the horizontally and transversely arranged elevating-rods 23, which connect each pair of the front and rear swinging supports or links 24. Each pair of said swinging supports and the elevating-rod connecting the same constitute one of the elevators for the guide-frame of the machine, and though this guide-frame may be connected with its elevating-support in many ways the construction shown in Figs. 3 and 4 involves rigidly fitting to the rear cross-bar 17 of the guide-frame the oppositely-located bearing-collars 31, loosely receiving the end portions of the elevating-rod 23 of the rear elevator, while the guides 15, contiguous to their front end portions, have fastened to their under sides similar bearing-collars 32, which loosely receive therethrough the elevating-rod 23 of the front elevator, thus completing a pivotal connection between the guide-frame and the rods of its elevating-support, so that when the front and rear elevators are swung upwardly a substantially "parallel" movement is effected, which causes the elevation of the guide-frame from the work through a lateral movement. In the construction just described when the clamping means 29 are loosened the entire elevating-support may be freely run back and forth upon the main base-rods 25 to carry the guide-frame and the machine parts sustained thereby to any position desired.

Although the guide-frame itself or any portion of its elevating-support may be grasped so as to impart to the frame the necessary movement to effect its elevation from the work, still a simple and practical operating means for handling the elevating-support and the guide-frame carried thereby is shown in the drawings and consists in extending one of the vertically-swinging supports or links 24 beyond the elevating-rod 23 to form an operating handle or lever 33, which can be grasped by the operator, so as to move the guide-frame and everything supported thereon up and down and also laterally with a minimum effort on the part of the operator. In carrying out this part of the invention—namely, the novel means for supporting and manipulating the entire guide-frame—any number of modifications may be resorted to other than already indicated—as, for instance, the front and rear cross-bars 16 and 17 of the guide-frame may be entirely dispensed with and the longitudinal guides 15 of the frame attached directly to the elevating-rods 23 of the front and rear frame-supports, hereinbefore termed "front" and "rear" elevators. This suggested modification is shown plainly in Fig. 31 of the drawings, and referring at this point to such figure of the drawings it will be observed that the longitudinal guides 15 may be provided at their end portions with bearing-collars 31ª, loosely receiving the elevating-rods 23 of the front and rear supports and the collars 31ª, of one of said rods being provided with set-screws or equivalent fastenings 34, permitting of the ready adjustment transversely of said guide to provide for carrying out the transversely-adjustable feature of the guide or supporting frame. In this modification the elevating-rods of the front and rear swinging supports or elevators constitute the front and rear cross-bars of the frame itself, and therefore the modification referred to does not destroy the feature of having the frame consisting of connected side and cross bars and comprising means for adjusting the transverse width of the frame without disconnection of the said side and cross bars constituting the same.

Another modification illustrating the wide range of utility of the vertically-swinging elevating-support for the guide-frame is suggested in Fig. 32 of the drawings, in which the elevating-support is non-shiftable upon main base-rods 25ª of just a sufficient length to provide for the proper support of the elevating-support and the guide-frame carried thereby. In this modification in order to bring the work into operative relation to the printing mechanism there is employed a shiftable work-holder 35, mounted upon suitable guides or ways 36 upon the base 1, and thus providing means for shifting either page of the book beneath the printing mechanism without either disturbing the book itself or the printing mechanism, it of course being understood that before the shifting of such work-holder it would be necessary to elevate the guide-frame from the work through the medium of the vertically-swinging elevating-supports already described. Various other embodiments involving modified ways of utilizing the rising and falling feature of the guide-frame through an endwise or sidewise movement thereof may necessarily be resorted to; but as the preferred manner of utilizing this part of the invention is shown in Figs. 3 and 4 of the drawings further reference to the same will be confined to such figures and those directly related thereto.

A part of the guide or main supporting-frame may be said to consist of the work-clamping plates 37, which are rigidly attached to the under side of the longitudinal guides 15 and extend not only a considerable distance longitudinally of said guides, but also project at both sides thereof. The projection of the work-clamping plates 37 at the inner sides of the guides is comparatively slight to produce the inner holding-lips 38, which materially aid in holding the sheet perfectly flat out to the marginal edges thereof and permit of the printing being carried very close to the margins.

In the preferable construction it will be observed that the rear cross or end bar 17 is considerably longer than the front bar and not only insures means for accommodating the transverse adjustment of the guide-frame, but also serves in the capacity of a brace and support for the work-clamping plates, which are preferably formed of flat sheet metal. The object of the clamping plates or strips 37 is twofold. First, when a book is being written upon the inner edges or holding-lips 38 of the said plates serve as clamps to hold the page smooth and in position, and it is therefore not absolutely necessary that the guides 15 rest directly upon the sheet or page being printed upon. Furthermore, the said clamping plates or strips being comparatively thin, the ribbon-guide of the machine can freely pass over the edges of said strips, so that the latter therefore make it possible for the writing or printing to be carried very near to the edges of the sheet. In the second place, irrespective of the page of the book being printed upon, the wide portion of one of the work-clamping plates will always extend across the line where the opposite pages are joined and part way across the page opposite to the one being printed upon, consequently preventing buckling of the opposite page and also obviating the possibility of the machine and its sliding track-carrier ever mutilating or soiling the page. These functions are rendered possible, inasmuch as the plates are of a sufficient width to extend over the page as far as the traveling mechanism can move at either end of the line.

Directly and intimately associated with the guide-frame, consisting of the longitudinal guides 15 and the front and rear cross-bars connecting such guides, is a track-carrier, which is slidably mounted upon the guides 15 and not only carries the track-rails, but also carries the entire line-spacing mechanism, with the exception of the operating device for such line-spacing mechanism, which operating device is carried by the traveling carriage containing the printing mechanism. The guide-frame as an entirety may be conveniently designated by the reference-numeral $15^a$, and the track-carrier may likewise be designated as an entirety by the reference-numeral 40, (see Fig. 3,) said track-carrier extending transversely across the guide-frame $15^a$ and designed to have a step-by-step sliding movement thereon for the line-spacing operation. The track-carrier is primarily designed as a sliding supporting medium for the parallel spaced front and rear track-rails 41 and 42, which are disposed transversely of the longitudinal guides 15 and respectively receive thereon the front and rear traveler-rollers 43 and 44, carried by the carriage 45, in a manner to be presently explained, and providing a rolling or traveling support for the carriage upon the rails 41 and 42. The said front and rear track-rails 41 and 42 are held in proper operative relation to each other and also to the traveling carriage through the medium of the oppositely-located track-slides 46 and 47, respectively. (See Fig. 3.) These track-slides are designed to have a slidable support directly upon the longitudinal guides 15 of the guide-frame, and each of said slides essentially consists of spaced longitudinally-alined slide-blocks $47^a$, having a slidable interlocking engagement with the upper side portions of the main guides 15 and rigidly united by platform-sections 48, arranged outside of the plane of the guides and suitably connected with the spaced slide-blocks. The structural formation of the slide-blocks or slide members proper and the means for rigidly uniting such blocks to form a track-slide may be varied considerably in the manufacture of the machine without affecting the general thought of a platform section or body carrying oppositely-arranged and longitudinally-alined slide-blocks or members which have a slidable interlocking engagement with the guides. In addition to the slide-blocks or slide members proper, $47^a$, the oppositely-arranged track-slides 46 and 47 are provided with front and rear rail-chairs 49 and 50, respectively, which chairs may be of any suitable construction so long as the same are provided with seats for properly receiving and holding the base portions of the track-rails 41 and 42, it being of course understood that the front rail-chairs 49 of the oppositely-located track-slides 46 and 47 receive and hold in position the front track-rail 41, while the rear rail-chairs 50 perform a similar function in connection with the rear track-rail 42. Furthermore, in the preferable construction which has been described, wherein the transverse or width adjustment of the guide-frame is accomplished through the adjustable mounting of the right-hand guide 15, the front and rear rail-chairs 49 and 50, carried by the track-slide 46 upon the left-hand guide, have the rails 41 and 42 secured fast therein, while the chairs 49 and 50 of the right-hand track-slide 47 are sufficiently loose upon the rails 41 and 42 to permit said chairs to freely slide thereon when the said right-hand guide 15 is moved transversely to vary the width of the guide-frame. This feature has been specifically described herein for the purpose of emphasizing how the important features of the machine set forth in the aforesaid Dukes patent may be preserved in connection with the improvements contemplated by the present invention.

In connection with the slidable track-carrier 40, which is essentially made up of the opposite slides 46 and 47, and the transverse track-rails 41 and 42, connecting the same, an important feature of the invention resides in a simple and practical construction of line-spacing mechanism carried by the track-carrier and coöperating with the ratchet-teeth 18 of the longitudinal guides. The said line-spacing mechanism includes duplicate elements associated with each track-slide, and the latter, as well as each guide, has associated therewith a line-spacing pawl 51, disposed in proximity to the inner ratchet-teeth 18 of the adjacent guide 15 and provided at one end with a laterally-disposed engaging point 52, adapted to be thrown in and out of engagement with the adjacent ratchet-teeth 18 during the operation of the line-spacing mechanism. Contiguous to the end opposite this point 52 each line-spacing pawl 51 is pivotally mounted, as at 53, upon a supporting-lug or equivalent projection 54, extended from one side of a reciprocatory plunger or plunger-stem 55, which stem is held to its reciprocatory movement by means of longitudinally-arranged guides 56, extended from the inner side of the oppositely-located slide blocks or members 47ª of the adjacent track-slide. Contiguous to its pivotal support each line-spacing pawl 51 is further provided with a laterally-offset cam-heel 57, adapted to be drawn into engagement with the pawl abutment or shoulder 58, provided upon the track-slide, and which pawl abutment or shoulder may be conveniently formed by one end of one of the slide-blocks of the track-slide.

Directly associated with each line-spacing pawl 51 is a pawl-adjusting spring 59, interposed between the pawl and the adjacent plunger-stem 55 and normally exerting its pressure in a direction to throw the engaging point 52 of the pawl into positive engagement with one of the ratchet-teeth 18 of one of the guides; but in the normal position of the different parts of the line-spacing mechanism the cam-heels 57 of the line-spacing pawls are held in engagement with the pawl abutments or shoulders 58, whereby the pawls are tilted upon their pivots or axes in a direction to hold the points thereof out of engagement with the ratchet-teeth. Consequently under normal conditions the pawls of the line-spacing mechanism have no positive engagement with the ratchet-teeth of the guides, whereby the track-carrier and the printing mechanism thereon may be freely slid back and forth upon the guide-frame to any desired position, as may be occasioned by the requirements of the work without the necessity of raising the guide-frame. Sufficient friction is maintained between the guides and the track-slides to prevent the jarring of the machine from causing a movement of the slides during the printing operation; but the construction just described for normally holding the line-spacing pawls out of engagement with the teeth of the guides possesses the advantage specified and dispenses with the necessity of a releasing device such as disclosed in the Duke's patent aforesaid.

The reciprocatory plunger-stems 55, which carry the spacing-pawls of the line-spacing mechanism, are provided with open keepers 60, which may be conveniently formed by a pair of spaced upturned lugs 61, projected upwardly from the plunger-stems and loosely receiving therebetween a transversely-movable spacing-bar 61ª, which transversely-movable spacing-bar, is disposed longitudinally of the track-carrier 40, but is arranged transversely of the guide-frame 15ª between the front and rear track-rails 41 and 42. The said spacing-bar is intended to exert a uniform action upon both of the plunger-stems, and consequently a "parallel" movement thereof should be maintained to insure a synchronous action at both ends thereof. To accomplish this, the opposite extremities of the spacing-bar 61ª are pivotally connected at 62, respectively, to the oppositely-located bell-cranks 63 and 64. The bell-crank 63 may be pivotally supported at its angle upon the left-hand track-slide 45, and the other bell-crank 64 may be pivotally mounted at its angle, as at 66, upon the bracket-arm 67, projected rearwardly from the right-hand extremity of the front track-rail 41, thus providing permanent supports for the two bell-cranks which will not interfere with the movement of the right-hand slide when adjusted together with the adjustable guide 15. This result may of course be accomplished by a different mounting of the bell-cranks.

The oppositely-located equalizing bell-crank levers 63 and 64 have their extremities opposite the connections, with the ends of the spacing-bar 61ª pivotally connected with the opposite ends of the coupling bar or rod 68, which is disposed in parallelism to the spacing-bar 61ª and in conjunction with the bell-cranks 63 and 64 insures the parallel movement of the spacing-bar, so that it will act synchronously upon both plunger-stems of the line-spacing mechanism. There is associated with the spacing-bar and preferably with one of the bell-cranks 64 a retracting-spring 69, which normally exerts its tension in a direction to retract the spacing-bar 61ª in a forward direction, and thus carry the cam-heels 57 of the line-spacing pawls against the abutments 58 to hold the said pawls out of engagement with the ratchet-teeth of the guides.

The instrumentalties of the line-spacing mechanism so far described are carried solely by the track-carrier 40, which is mounted directly upon the guide-frame 15ª, and to enable the operator to conveniently actuate the line-spacing mechanism from the traveling carriage 45 the said carriage has associated therewith an adjusting-lever 70, which is pivotally mounted intermediate its ends, as at 71, to the under side of the bottom plate 72 of the carriage-casing 73. The said adjusting-lever 70 is therefore carried by the traveling carriage, and at one end the adjusting-lever is provided with a downturned engaging fork 74, which has a loose traveling engagement with the upturned guiding-flange 75, projected upwardly from the spacing-bar 61ª. The said engaging fork 74 of the adjusting-lever 70 may be constructed in any suitable manner, but preferably consists of a pair of spaced antifriction-rollers 76, which will freely travel along the guiding-flange 75 as the carriage progresses under the letter-spacing action. At the end opposite the engaging fork 74 the said adjusting-lever 70 is bifurcated or slotted, as at 77, to loosely receive the lower extremity 78 of the pendent arm 79 of a bell-crank operating-lever 80, pivotally mounted at its angle, as at 81, within the carriage-casing 73 upon a side wall thereof, and provided at the extremity of its horizontal arm with an outturned finger-lever 82, projecting through a slot 85 in one side of the casing and exposed exterior to the casing upon one side, where it may be freely engaged by the finger of the operator.

It will be seen that the bell-crank operating-lever 80 and the adjusting-lever 70 constitute the entire operating device for the line-spacing mechanism which is carried by the traveling carriage. To advance the track-carrier with the type-carriage thereon a distance equal to the space between the lines being printed, it is simply necessary for the operator to depress the finger-lever 82, which action effects an oscillation of the adjusting-lever 70 in a direction to cause the spacing-bar 61 to move rearwardly against the pressure or tension of the retracting-spring 69. The rearward movement of the spacing-bar 61ª causes a corresponding rearward movement of the plunger-stems 55, thereby moving the heel ends of the line-spacing pawls away from the abutments or shoulders 58, so that the pawl-adjusting springs 59 may come into play and throw the points 52 of the pawls into engagement with the ratchet-teeth 18. A continued downward pressure upon the operating-lever 80, or at least the finger-lever thereof, will necessarily cause the track-carrier, with the type-carriage thereon, to advance forward and effect the line-spacing. When the finger is released from the lever 82, the spring 69 retracts all parts of the line-spacing mechanism to their normal positions, with the heel ends of the pawls engaged against the abutments or shoulders 58 in the manner and for the purposes already explained.

Before passing to the improvements embodied in the printing mechanism and the instrumentalities directly associated therewith it is to be observed that the track-carrier may be utilized for the purpose of sustaining an operator's scale 84 in a well-advanced position directly under the operator's eye as the keyboard is manipulated. The support of this operator's scale 84 may be effected in any convenient manner; but the same is preferably held transversely over the guide-frame 15ª through the medium of supporting arms or brackets 85, projected forwardly from the oppositely-located track-slides 46 and 47 at the outer sides of the guides 15. The supporting arm or bracket 85, extended from the left-hand track-slide 46, may have the operator's scale 84 rigidly attached thereto, as at 86, while a slidably-interlocking engagement 87 is provided between the said scale or scale-bar and the opposite supporting arm or bracket 85, so as not to interfere with the transverse adjustment of the adjustable guide 15. The operator's scale 84 is rendered effective by associating therewith an indicating-pointer 88, which indicating-pointer is attached to the front side bar 89 of the open rectangular keyboard-frame 90, constituting a front extension of the carriage-casing 73 and having the entire keyboard located inside of the plane thereof, as plainly shown in the drawings, and as will be more particularly pointed out.

The carriage 45, which has been referred to in connection with the various mechanisms and instrumentalities already described, is designed to carry therein the entire type-action, which includes the type-bars, keys, key connections, and all operating parts associated therewith, as well as the letter-spacing mechanism, the line-lock, the ribbon mechanism, and the means for transmitting motion to these several mechanisms. Referring at this point to the traveling support for the carriage 45 upon the track-rails of the track-carrier 40, it is to be noted that the front and rear traveler rollers or wheels 43 and 44 are arranged in opposite pairs, respectively, at opposite sides of the carriage-casing 73 and within the bottom portion thereof. The traveler-rollers 43 and 44 of each opposite pair of such rollers are carried by a carrying-axle 91, arranged parallel with the bottom plate 72 of the carriage-casing and preferably at the upper side of said bottom plate inside of the casing. Each of said carrying-axles is disposed longitudinally of the carriage or in parallelism with the guides 15 of the guide-frame 15$^a$, and the rollers 43 and 44 are supported or mounted, respectively, at the opposite ends of the axle in the same spaced relation as the track-rails 41 and 42 in order to properly engage such rails. At the opposite ends each axle preferably has associated therewith an antifriction-bearing support 92, comprising ball-bearings or any other suitable type of antifriction-bearings and including take-up bearing-screws 93, mounted in bearing-boxes 94, supported on the bottom plate 72 of the carriage-casing and in conjunction with the said screws 93 comprise means for not only providing an antifriction-bearing support for both ends of said roller-axle, but also permitting of the lengthwise adjustment of the axle by the thrust adjustment of the screw. It will be obvious that this construction not only permits of the true running of the rollers or wheels upon the track-rails, but also makes it possible to associate with the axles cone-bearings, ball-bearings, or any approved type of antifriction-bearing. Inasmuch as the roller-carrying axles 91 are located at the upper side of the bottom plate of the carriage-casing, the said bottom plate is provided with wheel-openings 95, through which the lower portions of the rollers project, so as to engage with the rails. In this connection it will be observed that the construction described provides for the type-carriage being mounted in the closest possible relation to the printing-plane, besides admitting of an exceedingly low keyboard being employed.

In the other patent aforesaid one of the objects of the invention stated therein was to mount the entire type-action comprehending the instrumentalities already referred to within the carriage-casing 73, which is of an open rectangular formation. The present invention has the same object in view and in addition to having the entire type-action carried by a single detachable frame the carriage-casing 73 has the bottom plate thereof likewise detachable, said bottom plate being provided at the sides thereof with upstanding holding flanges 96, (see Fig. 8,) which are detachably secured to the side walls of the casing 73 by screws 97 or equivalent fastenings, thus permitting of the ready assembling or disassembling of the parts of the carriage-casing. As will hereinafter appear, the detachable bottom plate 72 not only carries the traveler-rollers already described, but also the motion-transmitting element as well as the letter-spacing mechanism and the parts of the ribbon mechanism which may be operated from the said element. The said carriage-casing 73 is also provided with a removable cover 98, held in place by screws or equivalent fastenings 99, Fig. 1, so that when detached from the casing to uncover the top portion thereof the entire type-action may be readily lifted out of the carriage-casing without even disturbing the detachable bottom plate 72, thus providing easy means for assembling the entire machine, besides admitting of ready access to any desired part, and when the separable operative connection between the type action and the mechanism upon the bottom plate 72 is separated either the bottom plate, with the parts thereon, or the entire type-action, may be independently separated from the carriage-casing. These are important features from a structural standpoint and will be readily appreciated by those familiar with type-writer construction.

The support of the entire type-action is rendered possible by the employment of a single type-action-supporting frame 100, which type-action-supporting frame is plainly shown in a number of figures of the drawings and particularly in Figs. 8, 15, and 17, the latter figure being a skeletonized view showing only the type-action-supporting frame and the mounting of the substantially vertically movable or rising-and-falling type-bar carrier therein.

The single type-action-supporting frame 100 is of a general rectangular form, so as to properly register inside of the carriage-casing 73, but does not form a complete rectangle, as the same in the preferred form thereof essentially consists of a front side wall 101 and the rearwardly-projecting end walls 102 and 103, respectively, which end walls are of different lengths, as plainly shown in Figs. 15 and 17 of the drawings. The wall 102 is of only a sufficient width to provide for the proper bearing of the rocking supports, to be presently referred to in connection with the type-bar carrier; but to properly support certain mechanism the end wall 103 is considerably longer than the wall 102 and is provided at its rear end with a short attaching-flange 104. This structural formation of the type-action frame is, however, susceptible of a variety of modifications, as the essential feature thereof simply resides in such a formation as to not only provide a proper support for the type-bar carrier, but also a proper support for the shifting mechanism for the type-bars, the keyboard, and all intermediate connections. The said type-action-supporting frame 100 may be detachably held within the carriage-casing by any suitable means; but a very simple and practical mounting of the said frame is shown in the drawings and consists in associating with the end walls 102 and 103 thereof screws 105 or equivalent fastenings passed through the side walls of the carriage-casing. It is simply necessary to remove these screws to provide for the complete removal of the type-action frame and the entire type-action carried thereby.

In the present invention the type-basket is in the form of an arch and is located at the rear open side 106 of the carriage-casing, as plainly shown in Fig. 2 of the drawings, thus admitting of the writing being made almost perfectly visible and rendering it possible for even the line being written upon to be exposed to the view of the operator without disturbing the carriage or any part of the machine. The visibility of the writing is also rendered possible by reason of the fact that the carriage is of a comparatively shallow depth and has only a slight projection above the printing plane. The group of type-bars constituting the type-basket are carried by a substantially vertically movable or rising and falling type-bar carrier 107. (See Figs. 15 and 17.) The said vertically-movable or rising and falling type-bar carrier may be of any suitable or approved construction, but essentially consists of a hanger-ring 108 and a type-bar rest-ring 109, arranged above the hanger-ring and held in spaced relation thereto. Both of said rings are of a crescent form and are preferably rigidly connected together by the frame-standards 110, located at suitably opposite points adjacent to the sides of the carriage and rigidly united at their upper and lower ends, as at 111 and 112, respectively, to the type-bar rest-ring and the hanger-ring in order to provide a rigid structure and maintain the proper spaced relation between the two rings.

One of the important features of the invention resides in the manner of hanging or supporting the type-bar carrier 107 to permit of the rising-and-falling movement thereof in a horizontal plane, while at the same time entirely obviating the necessity for guides or similar devices to keep the type-bar carrier always horizontal. This part of the invention preferably involves the employment of a pair of upper and lower rocking supports 113 and 114, respectively, which rocking supports are arranged one above the other and are disposed transversely of the carriage, although said supports may properly be said to be arranged longitudinally of the supporting-frame 100, as the opposite extremities of said rocking shafts are journaled in bearings 115, formed in the end walls 102 and 103 of the frame 100.

The rocking supports 113 and 114, which are permanetly mounted within the type-action-supporting frame, are preferably in the form of rock-shafts, and each of said supports or shafts has rigidly fitted thereto a pair of oppositely-located rearwardly-extending hanger-arms 116. The rearwardly-extending hanger-arms for the upper rocking support or shaft 113 have collars or equivalent fast connections 117 at one end with the support 113 and at their other rear extremities have pivotal connections 118, with the type-bar carrier 107 preferably at the upper ends of the frame-standards 110. The lower pair of hanger-arms 116 are similarly connected at one end, as at 117$^a$, with the lower rocking support or shaft 114 and at their rear extremities have pivotal connections 119 with the type-bar carrier, preferably at the lower ends of the frame-standards 110. It will thus be seen that the hanger-arms 116, in connection with their carrying supports or shafts 113 and 114, constitute parallel pivotal swinging supports for the type-bar carrier, which insures the rising and falling thereof in a vertical direction, while always remaining in a horizontal position. Furthermore, the novel manner of hanging described permits of a more ready and perfect counterbalancing of the type-bar carrier to counterbalance the weight of said carrier and all parts supported thereby. A convenient way for effecting this counterbalancing of the type-bar carrier and the parts carried thereby may reside in the employment of the separate counterbalancing-springs 120 and 121. The spring 120 is shown as being of the coiled type and is mounted upon one of the rocking shafts, preferably the upper one, 113, and has extended therefrom a pressure-arm 122, engaging with one of the hanger-arms 116 and exerting a normal lifting pressure thereon. The other counterbalancing-spring 121 is illustrated as being preferably of the leaf type of spring, the same being secured fast at its lower end, as at 123, to the inner side of the type-action-supporting frame 100, adjacent to one end thereof, and having its other upper end sprung inward from the front wall of the type-action-supporting frame and loosely engaged, as at 124, with the projection or abutment 125, carried by the upper rocking shaft or support 113. The normal pressure or tendency of the spring 121 is exerted rearwardly against or upon the projection 125, and consequently in the same direction as the spring 120. To provide for uniformly counterbalancing the type-carrier at opposite points, separate oppositely-located springs are therefore desirable and necessary under most conditions; but one of said springs, 121, is preferably of the leaf type in order that a simple form of tension-adjuster 126 may be combined therewith. This tension-adjuster is shown as simply consisting of a screw mounted in the front wall of the type-action frame 100 and working against the spring 121 to regulate the tension thereof in order that a perfect counterbalancing of the type-bar carrier and the parts supported thereby may be maintained at all times. The counterbalancing of the type-bar carrier and the parts supported thereby is absolutely necessary in order that the shift movement may be effected by the operator with a minimum effort and with substantially the same ease as the manipulation of the type-keys themselves. This shift movement will be more particularly referred to in connection with the description of the shifting mechanism for the type-bars.

Arranged within the type-bar carrier 107 in upright position are the type-bars 127. The type-bars are grouped in the usual arched or segmental form and each carries a pair of type characters, commonly termed "upper" and "lower" case characters. To provide for the support of the separate type in the proper relation, each of the bars 127 is provided at its free swinging end with a pair of divergently-arranged type-carrying arms 128, to which are suitably fitted the type 129, and by reason of the divergent relation of the type-carrying arms 128 the upper and lower case type characters supported thereby necessarily have their printing-faces disposed at an angle to each other, but which are caused to strike the same printing-point by reason of the vertical shift movement of the type-bar carrier. This movement, it is understood, raises and lowers the fulcrums of the type-bars, according as an upper or lower case character may be desired to be brought into play.

As already stated, an important feature of the invention resides in the manner of hanging or supporting the type-bar carrier 107 in such a manner as to permit of the rising-and-falling movement thereof in a horizontal plane to raise and lower the fulcrums of the type-bars, while at the same time obviating the necessity for guides or similar devices, such as have heretofore been used in connection with vertically-movable or vertically-shiftable type-bar carriers. In carrying out this feature of the invention an important distinction should be noted from that class of vertically-movable or vertically-shiftable type-bar carriers which rise and fall in a true perpendicular or vertical plane, as in the present invention the type-bar carrier, while necessarily vertically movable, nevertheless has a movement which, strictly speaking, is substantially vertical. In view of the hanging of the type-bar carrier upon the hanger-arms 116 the same necessarily has a vertically-swinging movement as contradistinguished from a movement in a true perpendicular or vertical plane. However, as plainly shown by the different positions illustrated in Figs. 9 and 10 of the drawings, the hanger-arms 116 for the type-bar carrier swing an equal distance above and below the horizontal plane of the axes 113 114, and consequently while the type-bar carrier swings through the arc of the circle at the same time the movement of the hanger-arms referred to provides means whereby the type-bars in their elevated or uppermost positions are vertically over their depressed or lowered positions, hence not interfering with the proper action of the type-bars in the slightest degree and accomplishing every function of type-bar carriers, which rise in true vertical or perpendicular planes, and at the same time overcoming the known objections to the mounting of type-bar carriers of that class. In this connection it should be further observed that to secure a true parallel motion of the hanger-arms 116 the bearings for the rock-shafts 113 114 are necessarily the same vertical distance apart as the vertical distance between the pivotal connections 118 119.

Inasmuch as the novel mounting of the type-bar carrier as described possesses important advantages the diagrammatic Fig. 37 of the drawings is included to illustrate accurately the type-bar-carrier movement. Referring to this diagrammatic figure of the drawings, the letter A designates the center or axis of the arc through which the type-bar carrier swings, and as the rock-shafts 113 114 are connected with the type-bar carrier in parallel the center or axis A may be said to represent either of said rock-shafts or a point midway between them. In the diagram the arc through which the type-bar carrier vertically swings is designated by B C D, and the line A B indicates the position of a hanger or supporting arm with the type-bar carrier in its lowered position, while the line A D represents the position of such arm with the type action in its elevated or upper position. Although the type action or type-bar carrier really swings through the arc B C D, it will be observed that the same vertical or perpendicular plane E F intersects both the lower and upper positions B D of the type-bar carrier. Hence in the action of the type-bar carrier the type-bars in both of their positions will lie in the same vertical plane.

Furthermore, in the diagram of Fig. 37 the letter G represents the point of connection 151 (hereinafter referred to) of the pull-rods of the key-levers, and consequently by reason of the swinging movement of the hanger-arms an equal distance above and below the horizontal plane A C of the axis A there is practically no disturbance at the point G, and consequently no material disturbance of the key-levers of the keyboard.

Each type-bar 127 is provided at its lower end with an angled heel portion 130 and contiguous to such angled heel portion carries oppositely-projecting journals 131, turning in bearings 132, formed in the bearing-cheeks 133 of a type-bar hanger 134.

The type-bar hangers 134 are grouped or arranged in a semicircular series at the inner under side of the hanger-ring 108, as plainly shown in Figs. 8, 18, and 19 of the drawings, and each of said hangers is preferably formed of a strip of metal folded into an approximate U shape, with an eye 135 at the fold or bight thereof to receive the fastening-screw 136, passing through the eye and screwed into a threaded opening formed in the hanger-ring 108, the fastening-screws 136 for each pair of adjacent hangers 134 being preferably associated with a common binding-plate 137, as plainly shown in Fig. 18 of the drawings. Beyond the screw-receiving eye 135, at the fold thereof, each type-bar hanger 134 has the bearing-cheeks 133 thereof spread apart wider than the said eyes in order to provide a wide bearing for the type-bar associated therewith, while at the same time permitting the eye portions 135 of adjacent hangers to be grouped close together at the lower side of the hanger-ring, and consequently occupy a minimum amount of space. To permit of this, however, the bearing-cheek portions of adjacent hangers must overlap, and this is effected by having adjacent type-bar hangers alternately cut away upon reverse edges, so that such edges will match, as may be plainly seen from Figs. 18 and 20 of the drawings. This construction, however, in these particulars is substantially the same as set forth in the aforesaid patent; but the present invention contemplates more effective means for uniformly adjusting the type-bar hangers to take up the wear of the type-bar journals therein. To effect this function in a thoroughly practical manner, the side portions of each type-bar hanger between the eye 135 and the bearing-cheeks 133 thereof are provided at both their upper and lower edges with wedge-bevels 138, which are engaged by the correspondingly-beveled wedge-lugs 139 at the opposite ends of the adjusting-plates 140, which are arranged transversely of the side portions of the hanger, both at the top and bottom edges thereof. Each pair of adjusting-plates 140 associated with each type-bar hanger have connected thereto a common adjusting-screw 141.

From the foregoing description it will be obvious that any looseness in the individual bearing of each type-bar may be readily taken up by simply tightening the screw 141. The tightening of this screw necessarily causes the wedge-lugs 139 of both adjusting-plates to slide upon the wedge-bevels 138 and draw the bearing-cheeks 133 in a direction toward each other and upon the journals 131 of the type-bar.

The type-bars 137 normally stand in an upright position, preferably resting against a cushion 141ª, fitted in any suitable manner to the rest-ring 109 of the type-bar carrier 107, and the said type-bars are preferably held in their upright position and are returned to such position after actuation through the medium of retracting-springs 142. The upper end of the retracting-spring for each type-bar is connected to a fixed point of attachment above the hanger-ring and preferably to a point of connection 143 upon the upper rest-ring 109, while the lower end of said retracting-spring has a pivotal or loose connection, as at 144, with the type-bar above and slightly forward of its pivotal point 131. This is a preferable arrangement of the retracting-springs on account of the same providing for each spring exerting sufficient leverage to hold the same in a normally upright position without increasing the tension of the type action, while at the same time as each type-bar is swung downwardly under the influence of the key connection the leverage of each retracting-spring increases, so as to effect a quick or sharp retraction of the type-bar.

Each vibratory or pivotal type-bar 127 has associated therewith an upright type-bar bell-crank lever 145, pivotally supported at its angle on a bearing-block 146, fastened to the upper side of the hanger-ring 108 in front of the type-bars 127, and the lower horizontal arm of each vertically-disposed type-bar lever 145 has a pivotal link connection 147 with the angled heel 130 of the type-bar associated therewith. The several type-bar levers 145 are grouped in a semicircular series in front of the type-bars and are arranged in parallel planes, as will be clearly seen from Fig. 15 of the drawings, whereby a very compact disposition of such levers may be had, besides insuring a perfectly uniform key action for all of the type-bars by an upward pull upon the lower or heel ends of the same. Each of the said type-bar bell-crank levers 145 has pivotally connected to the upstanding or vertical arm thereof a pivot or connecting block 148, to which is adjustably connected, as at 149, the rear end of a pull-rod 150, which pull-rod extends forwardly from its connection with the type-bar lever 145 and at its front end has a pivotal connection 151 with the upstanding or vertical arm 152 of a bell-crank key-lever 153, constituting a part of the keyboard and arranged within the open rectangular keyboard-frame 90 at the front of the type-carriage. Each bell-crank key-lever 153 is mounted at its angle, as at 154, to a bearing-block or hanger 155, fastened to the type-action-supporting frame 100 and preferably upon the outer side of the front wall 101 of such frame, whereby the said front wall of the type-action frame will constitute a support for all of the key-levers of the keyboard. Each of the bell-crank key-levers is arranged in a vertical position and carries at the outer extremity of its horizontal arm a key 156, and it will be observed that there are necessarily several rows of bell-crank key-levers, according to the number of keys of the keyboard. The said levers are also of progressively-different sizes to provide for the stepped arrangement of the keys of the keyboard and also to permit the inner upstanding arms 152 to project to a common horizontal plane at the same side of a common universal bar 157, which will be hereinafter more fully described in connection with the means for transmitting the motion of the key-levers to the transmitting element which actuates the letter-spacing mechanism, and also the operative parts of the ribbon mechanism. It should also be noted that the key-levers are not only of progressively-different sizes, but also the proportion between the lengths of the key ends and the upstanding ends or portions of each set of levers is maintained, so that the leverage of all sets is the same and the dip of the keys is the same.

It will be obvious from the foregoing description that when any key 156 of the keyboard is depressed the bell-crank levers 153 and 145 will provide for the downward throw or swing of the type-bar, and after the type has struck the work the keys and their connections are immediately returned to a normal position by the action of the retracting-spring 142, assisted by the main tension-spring hereinafter referred to, and the type-action will necessarily be the same whether the type-bar carrier is in its lowered or elevated position.

The shifting mechanism for the vertically-movable or rising and falling type-bar carrier 107 is supported by the type-action-supporting frame 100 and has an operating connection within the keyboard of the machine. This shifting mechanism for the type-bar carrier includes an oscillatory shift-lever 158, which is pivotally supported at one end on a pivot 159, fitted to the end wall 103 of the type-action-supporting frame 100. Opposite the pivoted end thereof the shift-lever 158 has a pivotal link connection 160 with the vertically-movable or rising and falling type-bar carrier 107, which connection is at one side of the said carrier, as may be plainly seen from Figs. 10 and 15 of the drawings. At its pivoted end the oscillatory shift-lever 158 is provided with a cross-arm 161, carrying an offset longitudinally-slotted reverse-head 162. This longitudinally-slotted reverse-head is arranged parallel with the cross-arm 161 of the shift-lever and is preferably constructed with angled terminals 163, detachably screwed or otherwise fastened to corresponding terminals 164 of the cross-arm 161, although it will be understood that structural variations may be observed in this particular.

The slot 165 of the reverse-head 162 slidably receives therein the guide-pins 166, carried at the lower ends of a pair of reversely-bowed adjusting-links 167 and 168, respectively, both of which links constitute a part of the reversing device proper and are pivotally mounted at one end in contiguous relation, as at 168ª, upon a swinging lever-arm 169, carried upon the inner end of an adjusting-spindle 170. This adjusting-spindle is mounted in a suitable bearing 171 in the end wall 103 of the type-action-supporting frame and also projects through a slot or opening 172 in the wall of the carriage-casing 73. (See Fig. 14.) At its outer end exterior to the carriage-casing the adjusting-spindle 170 carries the reversing-key 174, which reversing-key is preferably in the form of a lever-handle, which can be conveniently manipulated by the operator.

The shiftable end of the adjusting-link 168, which engages the reverse-head 162, has connected thereto one end of a shiftable overbalancing-spring 175, the other end of which spring is connected, preferably, to tension-adjusting screw 176, which screw is suitably fitted to the attaching-flange 104 of the type-action-supporting frame 100. However, any other suitable expedient may be resorted to for making fast to a fixed point of attachment one end of the overbalancing-spring 175, while the other end of said spring is free to be adjusted to either side of the pivotal support of the shift-lever 158. The shiftable end of the other link 167 has connected thereto a pull-rod 177, which pull-rod has a suitable coupling connection 178 with the upstanding arm 179ª of the bell-crank key-lever 179, arranged within the keyboard and pivotally supported at its angle on a bearing-block or hanger 180, carried at the front wall of the type-action frame 100 and having mounted at its outer extremity the shift-key 181.

When the parts of the shifting mechanism are in the position shown in full lines in Fig. 9 and in dotted lines in Fig. 10, the pull-rod connection with the link 167 and the shiftable end of the overbalancing-spring 175 are both disposed at the upper part of the reverse-head 162 above the pivotal support 159 of the shift-lever 158, and the overbalancing-spring consequently exerts a pull upon the shift-lever above its pivot, consequently holding the said shift-lever pressed downward, so that the type-bar carrier will be normally in its lowered or depressed position, so that in the ordinary use of the machine lower-case characters may be printed. With the parts in the position described should it be desired to print an upper-case character the shift-key is depressed, consequently exerting an outward pull upon the cross-arm of the shift-lever upon its pivot, with a consequent raising of the shift-lever and the type-bar carrier, to which it is connected, with the result of lifting the fulcrums of the type-bars, so that the desired upper-case character may be printed. When the pressure is relieved from the shift-key, the overbalancing-spring 175 immediately retracts the type-bar carrier to its lowered position. In this action the overbalancing-spring has very little work imposed upon it, as the weight of the type-bar carrier and all of the parts is perfectly counterbalanced by the springs 120 and 121, already referred to.

Should it be desired to set the type-bar carrier for normally printing upper-case characters, the reverse-key 174 is manipulated to rock or swing the lever-arm 169 in a direction to simultaneously shift the pull-rod and spring connections, respectively, with the adjusting-links 167 and 168 to the lower end of the slotted reverse-head 162, carried by the shift-lever. The action of the two links is synchronous, and as the shiftable end of the overbalancing-spring is carried below the pivotal support 159 of the shift-lever the said spring will oscillate the shift-lever upward, with a consequent elevation of the type-bar carrier to its uppermost position. It will be normally held elevated in this position, and a pressure upon the shift-key will bring the type-bar carrier to a depressed position for the printing of lower-case characters.

In connection with the shifting mechanism described it will be observed that the adjusting-link 167 may be attached to the lever-arm or reverse-lever 169 at a point farther from the spindle or shaft 170 than the link 168, whereby the motion of the said link 167 is greater when the reverse-lever or lever-arm 169 is thrown over, thereby giving the shift-key a greater leverage than the overbalancing-spring in either position; also, the only force to be opposed by pressure upon the shift-key 181 is the overbalancing-spring 175 in either position of the type-action.

The common universal bar 157 is arranged in front of the transversely-alined upstanding arms 152 of the key-levers 153 and is preferably in the form of an arched lever comprising the upper horizontal bar portion and the pendent supporting-lugs 157ª, which are supported at their lower ends upon a carrying-shaft 182, which is carried by the type-action-supporting frame 100 at the front side thereof and is preferably journaled at its extremities in the bearing-brackets 183, riveted or otherwise suitably fastened to the front wall of the type-action frame and projecting outwardly therefrom at a point beneath the plane of the keyboard made up of the bell-crank key-levers. The upper horizontal bar portion 157, which, in effect, constitutes the common universal bar, is provided at or contiguous to one end thereof with an upstanding offset 178ª, which provides clearance for the coupling connection 178 of the shift-key lever 179 in order that this shift-key lever may have no influence upon the type-action and the related parts, although the shift-key lever and its key are arranged within the plane and constitute a part of the keyboard. Inasmuch as all of the key-levers operate individually against the common universal bar 157, it is necessary to provide an operative connection between such bar and the letter-spacing mechanism and other operative parts. This is preferably effected through the medium of latches 184, having a pivotal connection at their outer ends, as at 185, with the universal bar 157 and provided at the inner ends with engaging hooks 185ª, adapted to detachably engage over the flanged horizontal yoke-bar 186 of the upstanding yoke-lever 187, arranged within the carriage-casing and essentially comprising said bar 186 and the pendent lever-arms 188, which sustain the bar 186 and are mounted fast upon a single motion-transmitting element 189. This is arranged horizontally within the bottom portion of the carriage-casing and is journaled at its extremities in suitable bearings 190, mounted upon the upper side of the detachable bottom plate 72 of the carriage-casing, thus making the motion-transmitting element practically a permanent fixture on the detachable bottom plate, so that said bottom plate may be detached or fitted in place with the motion-transmitting element and its related parts thereon.

The main tension-spring of the type-action is associated directly with the motion-transmitting element 189, which, as observed, is preferably in the form of a rock-shaft, and a simple and practical arrangement of this tension-spring is shown in the drawings and consists in having a straight spring-leaf 191, secured fast at one end, as at 192, to the upper side of the detachable bottom plate 72 and having its free end bearing under a lug or projection 193, carried by the motion-transmitting element or shaft, so that as the same is drawn upon by the latch connection 184 the free end of the spring will be depressed, so that when pressure is relieved from the key in the keyboard the spring 191 exerts a retracting influence upon the motion-transmitting element or shaft and readjusts the same, as well as the parts operated thereby, into their normal positions. The tension of said spring 191 may be regulated conveniently through the medium of a tension-screw or equivalent device 194, mounted in the bottom plate and bearing against the under side of the spring. The construction just described is plainly shown in Figs. 8, 21, and 36 of the drawings.

The single motion-transmitting element or shaft 189 carries a series of lever-arms 188, certain of which arms constitute a part of the yoke-lever 187, as already described. One of these lever-arms has an operating-rod connection 195 with the upstanding arm of the upright swinging dog-lever 196 of the letter-spacing mechanism 197. This letter-spacing mechanism is carried as an entirety by a base-plate 198, which is detachably fastened by screws or equivalent fastening means 199 to the detachable bottom plate 72 over the opening 200 in said plate, within which the working parts of the said letter-spacing mechanism are exposed. The letter-spacing mechanism is therefore separately detachable from the bottom plate of the carriage, and is therefore easily removed and replaced whenever necessary for purposes of repair or adjustment. The said letter-spacing mechanism includes, in addition to the swinging dog-carrying lever 196, the star-wheel 201, a feed-shaft 202, a spacing-pinion 203, and a clutch 204, coöperating with the star-wheel and with which is associated the release-lever 205, pivotally mounted at the under side of the bottom plate and exposed to the operator at one side of the carriage. Further description of this letter-spacing mechanism is unnecessary, as it is not claimed herein. So it will therefore be understood that any approved type of letter-spacing mechanism may be associated with the motion-transmitting element 189. The spacing-pinion 203 of said letter-spacing mechanism coöperates with a rack 206, which is carried by the track-carrier 40 and is preferably secured fast to the rear track-rail 42, as plainly shown in Fig. 3 of the drawings.

As the motion-transmitting element is rocked under the influence of the key connections described the usual escapement action will take place in the letter-spacing mechanism, thus releasing the feed-shaft 202, so that the carriage may be advanced a letter-space at a time under the influence of the carriage-actuator 207, which may be of any approved construction, but preferably consists of the usual spring-actuated drum carrying the pull-tape 208, having a connection with one side of the carriage. This connection may consist, as shown, of a hook 209, projected from one side of the carriage and detachably engaged by one end of the tape 208, so that when the carriage is taken off of the track-carrier the tape may be readily disconnected and temporarily reëngaged with a holding-hook 210 on the track-carrier, as plainly shown in Fig. 3 of the drawings. This provides for holding the spring-drum wound up always ready for use.

In addition to the operative connection with the letter-spacing mechanism 197 the main transmitting element or rock-shaft 189 has connected to certain of its lever-arms 188 the operating-rod connections 211, extending to and operating the pawl-carriers 212, upon which are mounted the actuating-pawls 213 for the ribbon mechanism, said pawls coöperating with the ratchet-wheels 214 for the spools 215 of such mechanism. Hence provision is also made in the present case for actuating the ribbon mechanism directly from the same motion-transmitting element which operates or actuates the letter-spacing mechanism; but as the ribbon mechanism forms no part of the present invention a detail description of the different parts and operation thereof is deemed unnecessary.

Referring again to the detachable operative connection between the common universal bar and the yoke-lever for the motion-transmitting element, it will be observed that by slightly pressing the yoke 187 in a forward direction the engaging hooks of the latches 184 may be readily disengaged from the yoke-lever of the motion-transmitting element or shaft, thus permitting of the ready removal of the type-action frame and all parts carried thereby without disturbing the motion-transmitting element or shaft 189 and the permanent connections therewith which are mounted upon the separately-detachable bottom plate of the carriage.

In connection with the common universal bar 157 there is also associated a space-key yoke-lever 220. This space-key yoke-lever extends around and follows the outline of the entire keyboard and carries upon its front side bar 221 the space-key 222 of ordinary form, while the end bars 223 of the space-key yoke-lever are pivotally mounted at their inner ends, as at 224, upon the end portions of the carrying-shaft 182 and are provided at such inner pivoted terminals with the upstanding bearing-arms 225, having inturned lugs 226, loosely engaging behind the pendent legs 157$^a$ of the universal bar. This construction provides means whereby the motion of the space-key under pressure will be transferred directly to the universal bar and thence to the motion-transmitting element. An auxiliary return-spring 227 is preferably arranged to bear upon an offstanding abutment-arm 228, projected outwardly from one of the end portions of the space-key yoke-lever, so as to entirely relieve the weight of this lever from the universal bar and at the same time normally hold the space-lever against any movement when the universal bar is actuated by the key-levers.

The present invention contemplates an advantageous improvement in the line-lock, which is associated with the carriage and the track-carrier to provide means when the end of the line is reached for automatically locking every part of the machine, thereby preventing the piling up of letters and also preventing the type from striking any metallic parts of the track-carrier.

Essentially the present invention involves two distinctive improvements in the line-lock device, one of which resides in means for releasing or resetting the line-lock from the keyboard and the other of which relates to an improvement in the mounting of the line-lock trip, whereby the same may be set to any predetermined position at which it may be desired to throw the line-lock in operation. While the invention is restricted particularly to these improvements, the same must necessarily be described somewhat in connection with the entire device to give an intelligent idea of the utility of the improvements.

The line-lock device as an entirety includes as one of the members or elements thereof a line-lock trip 229, which trip may be said to be carried by the track-carrier 40 and is arranged in a set position, so as to be engaged by the coöperating member of the lock which is carried by the traveling type-carriage. The said line-lock trip 229 is not essentially different from the similar trip set forth in the patent aforesaid and is provided with an upstanding shouldered trip-flange 230 and at the side edge opposite said trip-flange with an offset inclined cam-piece 231; but the present invention contemplates the adjustable mounting of the trip 229, so that the same may be set to any predetermined position. This may be accomplished in a variety of ways—such, for instance, as suggested in the drawings, in which the trip is illustrated in the form of a boxing slidably mounted upon a scaled trip-holding bar 232, which bar is conveniently mounted rigid upon the right-hand track-slide 46 and is disposed transversely to the guides of the guide-frame. The said trip-holding bar 232 is also of a sufficient length to permit of a wide range of adjustment for the trip 229, and said bar may be provided at one edge with a series of catch-teeth 233, adapted to be engaged by a spring or equivalent catch 234, formed in or fitted to the boxing constituting the trip 229, although any equivalent catch device or fastening may be substituted for the purpose of holding the said trip 229 in any of its adjusted positions.

Coöperating with the adjustable trip 229 is the spring-actuated horizontally-swinging and vertically-movable trip-lever 235, which trip-lever is pivotally mounted at one end, as at 236, upon the bottom plate 72 and has associated therewith the adjusting-spring 237, which normally tends to press the lever into engagement with the notch 238 of the pendent foot 239 at the free swinging end of the lock-lever 240. This lock-lever is pivotally supported at the end opposite its pendent foot upon a pivot 241, fitted to the holding-flange 96 or other convenient point of support on the bottom plate of the carriage-casing, it only being necessary that one end of said lock-lever be pivoted, so that the other end will fall by gravity when the trip-lever becomes disengaged from the notched foot by coming in contact with the shouldered trip-flange 230 of the adjustable trip 229. At its front or pivoted end the lock-lever 240 has suitably connected therewith a release-key 242. This release-key may be of any suitable form that will provide for swinging the lock-lever upwardly when the said key is depressed. A simple exemplification of this key, however, is shown as consisting of a forwardly-extending finger-lever 243, secured fast at its rear end, as at 244, to the lock-lever contiguous to its pivot and provided at its forward extremity with a key member 245, disposed within the area or plane of the keyboard, as may be plainly seen from Fig. 2 of the drawings.

At an intermediate point between its ends the lock-lever 240 is provided with an upstanding angled stop arm or projection 246, which is normally held out of an interfering position to and coöperates with an upstanding locking-arm 247, carried by the motion-transmitting element or rock-shaft 189. The operation of this line-lock device is fully explained in the other patent aforesaid, and it is therefore understood that when the carriage advances so as to bring the trip-lever 235 against the shouldered trip-flange 230 of the trip the said trip-lever becomes disengaged from the notched foot of the lock-lever and permits the latter to fall, bringing the stop-arm 246 into interference or interlocking engagement with the locking-arm 247 of the motion-transmitting element, thus locking the type-action and all mechanisms from further action. Upon the return movement of the carriage the pendent foot rides up over the cam-piece 231 and automatically resets the parts, or if additional letters are to be placed on the line the release-key 242 may be depressed, so as to elevate the lock-lever from its interfering position with reference to the locking-arm of the motion-transmitting element or shaft 189. The trip-holding bar 232 may also have mounted thereon an adjustable bell-trip 248, also conveniently in the form of a boxing slidably mounted upon the bar 232 and held in any adjusted position by a spring-latch or equivalent fastening 249. The said bell-trip or trip-boxing is also provided with an upstanding trip projection 250, which is adapted to be engaged by the pivotal trip-dog 251, pivotally mounted at one extremity of the trip-arm 252. This trip-arm is carried by a short rock-shaft 253, normally pressed in one direction under the influence of a retracting-spring 254, coiled thereon and carrying an upstanding striker-arm 255, which striker-arm carries at one extremity the hammer 256, having a play against the alarm-bell 257, mounted in the top part of the carriage-casing. The adjustable alarm-trip 248 being arranged in advance of the line-lock trip causes an actuation or striking of the bell as the trip 251 moves against the trip projection 250, thus giving the usual alarm before the end of the line is reached. On the return of the carriage the pivoted dog 251 freely trails back over the projection 250.

The specific type of bell mechanism described is necessarily subject to a variety of modifications, and, in fact, any suitable bell-actuating device may be utilized in carrying out the invention in connection with the bell-trip of the adjustable form described. However, the construction set forth provides a simple and practical bell-actuating means, which effectively coöperates with the adjustable bell-trip 248.

It is thought that the improvements contemplated by the present application will now be fully understood without further description, and we also desire it to be understood that various changes in the form, proportion, and minor details of construction may be resorted to without departing from the spirit or sacrificing any of the advantages of the invention. As illustrative of such changes or additional modifications as may be resorted to diagrammatic figures 39 and 40 are incorporated in the drawings. These views exemplify the wide modification to which the invention is susceptible in relation to the mounting of the main supporting or guide frame, while at the same providing for the raising and lowering of the entire framework by bodily lateral movement thereof. Referring more specifically to the modification, 25 25 designate the front and rear supporting or base rods, 15 the guide or main supporting frame, and 24 the swinging elevating-links which connect one end of the frame with one of the base-rods 25, while the other of said base-rods may loosely receive thereon the other end portion of the guide-frame. The dotted line in the two figures indicates the plane of writing.

In the construction referred to the lateral movement of the guide-frame (without lifting the free ends thereof) effects an elevation bodily of the guide-frame from the plane of writing, as plainly shown by the different positions of parts illustrated in Fig. 40. Consequently in a broad sense the construction referred to permits of an elevation of the frame as an entirety through lateral movement thereof without a synchronous elevation of both the front and rear ends of the frame, as provided for by the use of both front and rear elevating-supports.

Having thus described our invention, what we claim as new, and desire to secure by Letters Patent, is—

1. In a type-writing machine, a main support, a rising and falling guide-frame sustaining the printing mechanism and its related parts, and means for independently and bodily raising and lowering said guide-frame without detaching the same from its support at any point.

2. In a type-writing machine, a main support, a rising and falling guide-frame sustaining the printing mechanism and its related parts, and means for effecting the bodily raising and lowering of said frame through a movement thereof independent of the main support.

3. In a type-writing machine, a main support, a rising and falling guide-frame sustaining the printing mechanism and its related parts, and means for effecting a synchronous bodily raising and lowering of the frame through a lateral motion thereof.

4. In a type-writing machine, a main support, a rising and falling guide-frame sustaining the printing mechanism and its related parts, and means for effecting the bodily raising and lowering of said frame through an independent lateral motion of itself.

5. In a type-writing machine, a main support, a rising and falling guide-frame sustaining the printing mechanism and its related parts, and means for effecting a bodily raising and lowering of said frame through a movement of the latter independent of the main support and while the frame remains supported at opposite points.

6. In a type-writing machine, a main support, a rising and falling guide-frame sustaining the printing mechanism and its related parts, and means for effecting the bodily raising and lowering of said frame through an independent lateral motion of itself while supported at opposite points.

7. In a type-writing machine, a main support, a rising and falling guide-frame sustaining the printing mechanism and its related parts, and means for effecting the bodily raising and lowering of said frame through a motion thereof independent of the main support and also while supported at opposite points outside of the printing area.

8. In a type-writing machine, a main support, a rising and falling guide-frame sustaining the printing mechanism and its related parts, and means for effecting the bodily raising and lowering of said frame through an independent lateral motion of itself while supported at opposite points outside of the printing area.

9. In a type-writing machine, a main support, a rising and falling guide-frame sustaining the printing mechanism and its related parts, and means for effecting a bodily raising and lowering of said frame through an independent reciprocatory motion thereof.

10. In a type-writing machine, a main support, a rising and falling guide-frame sustaining the printing mechanism and its related parts, and means for effecting a bodily raising and lowering of said frame through an independent reciprocatory motion thereof while supported at opposite points.

11. In a type-writing machine, a main support, a rising and falling guide-frame sustaining the printing mechanism and its related parts, and means for effecting a bodily raising and lowering of said frame through an independent reciprocatory motion thereof while supported at opposite points outside of the printing area.

12. In a type-writing machine, a main support, a rising and falling guide-frame sustaining the printing mechanism and its related parts, and supporting means coöperating with the frame to permit of an independent substantially parallel motion thereof in the rising-and-falling movement.

13. In a type-writing machine, a main support, a rising and falling guide-frame sustaining the printing mechanism and its related parts, and supporting means coöperating with the frame to permit of an independent substantially parallel motion thereof while the frame is supported at opposite points.

14. In a type-writing machine, a main support, a guide-frame sustaining the printing mechanism and its related parts, and means for raising and lowering the said frame by a synchronous movement of the oppositely-supported portions thereof independently of the main support.

15. In a type-writing machine, a main support, the guide-frame sustaining the printing mechanism and its related parts, and means for effecting a raising and lowering of said entire frame by a bodily rising-and-falling arcuate motion thereof.

16. In a type-writing machine, a guide-frame sustaining the printing mechanism and its track, and a support for the guide-frame comprising means for effecting the synchronous elevation of the front and rear ends of the frame through an independent movement of the latter.

17. In a type-writing machine, a guide-frame sustaining the printing mechanism and its track, a main support, and a separate support carried by the main support and comprising means for effecting a synchronous elevation of the front and rear ends of the guide-frame through an independent movement of the latter.

18. In a type-writing machine, a main support, a guide-frame sustaining the printing mechanism and its track, and a separate support for the guide-frame carried by the main support and comprising means for effecting the synchronous raising and lowering of the entire guide-frame with the machine parts thereon by an independent movement of the frame while the latter remains in an approximately horizontal position.

19. In a type-writing machine, a guide-frame sustaining the printing mechanism and its tracks, and a transversely-shiftable support for said frame comprising means for effecting a rising and falling movement thereof.

20. In a type-writing machine, a main support, a rising and falling guide-frame sustaining the printing mechanism and its track, and a shiftable support for the guide-frame comprising means for effecting a bodily raising and lowering of the latter from and to the work with the latter in position for printing without disturbing the same.

21. In a type-writing machine, a rising and falling guide-frame sustaining the printing mechanism and its track, and a transversely-shiftable support for the guide-frame comprising means for effecting the raising and lowering of the latter with the same in an approximately horizontal position.

22. In a type-writing machine, a rising and falling guide-frame of variable width, and a transversely-shiftable support for the said guide-frame comprising means for effecting the raising and lowering of the latter.

23. In a type-writing machine, a main support, a guide-frame of variable width and sustaining the printing mechanism and its track, and a transversely-shiftable guide-frame support carried by the main support and comprising means for effecting a rising-and-falling movement of the frame.

24. In a type-writing machine, a vertically-adjustable main support, a guide-frame of variable width and sustaining the printing mechanism and its track, and a transversely-shiftable guide-frame support carried by the main support.

25. In a type-writing machine, the main supporting or base rods, a rising and falling guide-frame sustaining the printing mechanism and its track, and an elevating-support for the guide-frame carried by the main supporting or base rods.

26. In a type-writing machine, front and rear parallel base-rods, a rising and falling guide-frame sustaining the printing mechanism and its track, and an elevating-support for the guide-frame having members mounted upon the base-rods.

27. In a type-writing machine, parallel oppositely-arranged base-rods, a rising and falling guide-frame sustaining the printing mechanism and its track, and an elevating-support for the guide-frame having a shiftable engagement with said base-rods.

28. In a type-writing machine, oppositely-located vertically-adjustable horizontal base-rods, a rising and falling guide-frame sustaining the printing mechanism and its track, and an elevating-support for the guide-frame having members loosely and shiftably engaging the base-rods.

29. In a type-writing machine, a guide-frame of variable width sustaining the printing mechanism and its track, oppositely-located vertically-adjustable base-rods, and a shiftable elevating-support for the guide-frame having a shiftable engagement with the base-rods.

30. In a type-writing machine, a rising and falling guide-frame sustaining the printing mechanism and its track, and vertically-swinging elevators for the front and rear end portions of said frame, said elevators providing for a substantially parallel motion to secure the raising and lowering of the frame by movement of the latter.

31. In a type-writing machine, a guide-frame sustaining the printing mechanism and its track, and transversely-shiftable elevators for the front and rear end portions of the guide-frame, said shiftable elevators comprising means for securing the raising and lowering of the frame through an independent movement of the latter.

32. In a type-writing machine, a rising and falling guide-frame sustaining the printing mechanism and its track, of an elevating-support for the guide-frame comprising front and rear vertically-swinging frame-supports having pivotal connections respectively with the front and rear portions of the frame.

33. In a type-writing machine, a rising and falling guide-frame sustaining the printing mechanism and its track, of an elevating-support essentially consisting of front and rear vertically-swinging frame supports or elevators having elevating-rods loosely connected with the front and rear portions of the frame to effect the rise and fall thereof through a substantially parallel motion of the same.

34. In a type-writing machine, the base-rods, a rising and falling guide-frame for the printing mechanism and its track, and front and rear frame-supports consisting of swinging links pivotally mounted on the base-rods, and elevating-rods connecting the swinging ends of said links, said elevating-rods having loose bearing connections with the frame.

35. In a type-writing machine, the base-rods, a rising and falling guide-frame sustaining the printing mechanism and its track, front and rear main supports consisting of swinging links pivotally and shiftably mounted upon the base-rods, and elevating-rods connecting the swinging ends of said links, said elevating-rods having loose bearing connections with the guide-frame to effect the raising and lowering thereof through a parallel movement, whereby the frame remains in an approximately horizontal position during the rise and fall thereof.

36. In a type-writing machine, the base-rods, a rising and falling guide-frame sustaining the printing mechanism and its track, front and rear frame supports or elevators consisting of vertically-swinging links pivotally mounted at one end upon the base-rods, and elevating-rods connecting the free or swinging ends of said links, one of the latter being provided with an operating end or lever, and bearing-collars carried by the rising and falling guide-frame and loosely receiving the elevating-rods of said front and rear supports or elevators.

37. In a type-writing machine, a guide-frame having longitudinal guides, and work-clamping plates carried by the guides at the under side thereof and projecting at both sides of the guides.

38. In a type-writing machine, a guide-frame having longitudinal guides, and work-clamping plates carried by the guides at the under side thereof and having extended portions disposed at the outer side of the guides to hold down the page opposite the one being printed upon in bookwork.

39. In a type-writing machine, the guide-frame having longitudinal guides, and flat work-clamping plates extending longitudinally of the guides beneath the latter and projecting at both sides of the same, the wider portions of said plates being disposed at the outer side of the guides to hold down the page opposite the one being printed upon in bookwork.

40. In a type-writing machine, the guide-frame, a track-carrier slidably mounted upon the guide-frame and essentially comprising oppositely-located track-slides and transversely-arranged track-rails carried by said slides and supporting the printing mechanism, each of the track-slides embodying longitudinally-alined slide-blocks engaging with the guides of the guide-frame, and a platform-section located outside of the plane of the guides and rigidly uniting the separate slide-blocks, the platform-sections of the said slides affording a supporting-base for parts of the line-spacing mechanism and other instrumentalities of the machine.

41. In a type-writing machine, a guide-frame, a track-carrier mounted upon the guide-frame, and having scale-supports extended from the front side thereof substantially within the plane of the guides of said frame, a transverse operator's scale held by said supports transversely of the frame in substantially the same plane, and the carriage carrying an indicator-pointer coöperating with said scale.

42. In a type-writing machine, a transversely-adjustable guide-frame, a track-carrier mounted upon the guide-frame and having adjustment compensating for that of the guide-frame, an operator's scale carried by the track-carrier and supported to permit of said adjustment, and the type-carriage carrying a pointer coöperating with said scale.

43. In a type-writing machine, a guide-frame having a transversely-adjustable member, a track-carrier mounted upon the guide-frame and also having a member adjustable with the adjustable member of the guide-frame, scale-supports extended from the track-carrier, an operator's scale secured fast to one of said supports and having a slidable engagement with the other, and a type-carriage carrying a pointer coöperating with the scale.

44. In a type-writing machine for printing upon flat surfaces, the longitudinal guides having ratchet-teeth, a track-carrier having a free sliding engagement with the guides, line-spacing mechanism movable with the track-carrier and having spacing-pawls normally disengaged from the ratchet-teeth to permit the track-carrier and the printing mechanism thereon to be freely slid manually backward or forward to any position without using the said line-spacing mechanism, the type-carriage, and an operating device for the line-spacing mechanism.

45. In a type-writing machine for printing upon flat surfaces, the longitudinal guides having ratchet-teeth, a track-carrier having a sliding engagement with the guides, line-spacing mechanism movable with the track-carrier and having reciprocatory spacing-pawls normally disengaged from the ratchet-teeth to permit of the sliding movement of the track-carrier and the printing mechanism thereon to any position in either direction without using the line-spacing mechanism, the carriage, and an operating device for the line-spacing mechanism supported and carried by the carriage.

46. In a type-writing machine for printing upon flat surfaces, the longitudinal guides having ratchet-teeth, the track-carrier having a free sliding engagement with the guides, line-spacing mechanism supported by the track-carrier and movable therewith, said spacing mechanism having reciprocatory spacing-pawls, and a spacing-bar operatively related to the pawls, said pawls being normally disengaged from the ratchet-teeth to permit the track-carrier and the printing mechanism thereon to be freely moved to any position in either direction without using the line-spacing mechanism, the carriage, and an operating device having an operative traveling engagement with the line-spacing mechanism and carried by the carriage.

47. In a type-writing machine, the longitudinal guides having ratchet-teeth, a track-carrier mounted upon the guides, line-spacing mechanism supported by the track-carrier and having pawls coöperating with said ratchet-teeth and also a spacing-bar operatively related to the pawls, and the carriage carrying an operating device coöperating directly with the said spacing-bar carried by the track-carrier.

48. In a type-writing machine, the longitudinal guides having ratchet-teeth, the track-carrier mounted upon the guides, line-spacing mechanism supported by the track-carrier and having spacing-pawls, and a spacing-bar operatively related to said pawls, and the carriage carrying a line-spacing-mechanism-operating device having an operative traveling engagement with the said spacing-bar carried by the track-carrier.

49. In a type-writing machine, the guides having ratchet-teeth, the track-carrier mounted upon the guides, line-spacing mechanism supported by the track-carrier and having spacing-pawls and also a transverse horizontally-movable spacing-bar operatively related to the pawls, and the carriage carrying an operating device for the line-spacing mechanism having an operative traveling engagement with the spacing-bar carried by the track-carrier.

50. In a type-writing machine, the guides having ratchet-teeth, a track-carrier mounted upon the guides, line-spacing mechanism supported by the track-carrier and having spacing-pawls and a spacing-bar operatively related to said pawls, the type-carriage, and an operating device for the line-spacing mechanism carried by the carriage, said operating device including an adjusting-lever having a traveling engagement with the spacing-bar, and an operating-lever for the said adjusting-lever.

51. In a type-writing machine, the guides having ratchet-teeth, a track-carrier mounted upon the guides, line-spacing mechanism supported by the track-carrier and having spacing-pawls and a spacing-bar operatively related to said pawls, the type-carriage, and an operating device for the line-spacing mechanism carried by the carriage, said operating device comprising an adjusting-lever having a fork slidably engaging the spacing-bar, and an operating-lever for the said adjusting-lever.

52. In a type-writing machine, the guides having ratchet-teeth, a track-carrier mounted upon the guides, line-spacing mechanism supported by the track-carrier and having spacing-pawls and a spacing-bar operatively related to said pawls, the type-carriage, and an operating device for the line-spacing mechanism carried by the carriage, said operating device comprising an adjusting-lever provided at one end with an engaging fork having a traveling engagement with the spacing-bar, and an operating-lever having a loose connection with the other end of the adjusting-lever.

53. In a type-writing machine, the guides having ratchet-teeth, a track-carrier mounted upon the guides, line-spacing mechanism supported by the track-carrier and having spacing-pawls and a spacing-bar operatively related to said pawls, the type-carriage, and an operating device for the line-spacing mechanism carried by the carriage, said operating device comprising a pivotal adjusting-lever provided at one end with a pendent fork having a traveling engagement with the spacing-bar and an operating-lever having a loose connection with the other end of said adjusting-lever.

54. In a type-writing machine, the guides having ratchet-teeth, a track-carrier mounted upon the guides, line-spacing mechanism supported by the track-carrier and having spacing-pawls and a spacing-bar operatively related to said pawls, the type-carriage, and an operating device for the line-spacing mechanism carried by said carriage, said operating device comprising a pivotal adjusting-lever provided at one end with a pendent fork having a traveling engagement with the spacing-bar, and a bell-crank-operating lever mounted inside of the carriage-casing and having a loose connection at one end with the adjusting-lever and at its other end provided with a finger key or lever arranged exterior to the carriage-casing.

55. In a type-writing machine, the guides having ratchet-teeth, a track-carrier mounted upon the guides, line-spacing mechanism supported by the track-carrier and having spacing-pawls and a spacing-bar operatively related to the pawls, said spacing-bar being provided with an upturned guiding-flange, the carriage, and the operating device for the line-spacing mechanism carried by the carriage and having an adjusting-lever provided with an engaging fork having a traveling engagement with said guiding-flange.

56. In a type-writing machine for printing upon flat surfaces, the guides having ratchet-teeth, a track-carrier having a free sliding engagement with the guides, line-spacing mechanism supported by the carrier and including spring-retracted plunger-stems carrying spacing-pawls, means for normally holding the pawls out of engagement with the ratchet-teeth to permit the carrier to be freely slid backward and forward to any position without employing the line-spacing mechanism, the carriage, and an operating device carried by the carriage, and having an operative relation to said plunger-stems.

57. In a type-writing machine, the guides having ratchet-teeth, a track-carrier, line-spacing mechanism supported by the carrier and including reciprocatory plungers carrying spacing-pawls and also a spacing-bar operatively connected with said plungers, the carriage, and an operating device carried by the carriage and operatively related to the spacing-bar carried by the carrier.

58. In a type-writing machine, the guides having ratchet-teeth, a track-carrier mounted upon the guides, line-spacing mechanism supported by the track-carrier and including reciprocatory plungers carrying spacing-pawls, a transversely-arranged spacing-bar operatively connected with both plungers, and also means for causing the spacing-bar to have a parallel horizontal movement, the carriage, and an operating device carried by the carriage and having a traveling connection with the spacing-bar carried by the carrier.

59. In a type-writing machine, the guides having ratchet-teeth, a track-carrier mounted upon the guides, line-spacing mechanism supported by the track-carrier and including reciprocatory plungers carrying spacing-pawls, a transverse spacing-bar having an operative connection with both plungers, a parallel bar connection with the spacing-bar to insure the parallel horizontal movement thereof, the type-carriage, and an operating device for the spacing-bar.

60. In a type-writing machine, the guides having ratchet-teeth, the track-carrier mounted on the guides, line-spacing mechanism supported by the track-carrier and including reciprocatory plungers carrying spacing-pawls, a transverse spacing-bar having a connection with both plungers to cause the synchronous movement thereof, oppositely-arranged equalizing bell-crank levers supported by the track-carrier and connected with the spacing-bar, and a parallel coupling-bar also connected with said equalizing-levers, the carriage, and an operating device for the spacing-bar.

61. In a type-writing machine, the guides having ratchet-teeth, a track-carrier mounted on the guides, line-spacing mechanism supported by the track-carrier and including reciprocatory plungers carrying spacing-pawls and having upstanding open keepers, a transversely-disposed spacing-bar engaging in the keepers of both plungers, said spacing-bar constituting a part of the line-spacing mechanism supported by the track-carrier, the carriage, and an operating device coöperating with said spacing-bar.

62. In a type-writing machine for printing upon flat surfaces, the guides having ratchet-teeth, a track-carrier slidably mounted on the guides, line-spacing mechanism supported by the track-carrier and including reciprocatory plungers carrying spacing-pawls normally held in an inactive position with relation to the ratchet-teeth to permit the track-carrier to be freely slid backward or forward to any position desired without employing the line-spacing mechanism, and means for causing the said pawls to become engaged with the ratchet-teeth when removed from their normal at-rest plane.

63. In a type-writing machine, the guides having ratchet-teeth, the track-carrier having pawl-abutments, and line-spacing mechanism supported by the track-carrier and including reciprocatory plungers, individually spring-actuated spacing-pawls carried by the plungers, said pawls having cam-heels coöperating with the pawl-abutments, suitably-arranged retracting means for the plungers to draw the heels of the pawls against the abutments, and an operating device for the line-spacing mechanism.

64. In a type-writing machine, the guides having ratchet-teeth, a track-carrier mounted on the guides and having pawl-abutments, line-spacing mechanism supported by the track-carrier and including reciprocatory plungers, individually spring-actuated spacing-pawls pivotally supported by the plungers and having contiguous to their pivots cam-heels coöperating with the abutments, a suitably-arranged retracting-spring for the plungers, the carriage, and an operating device for the line-spacing mechanism.

65. In a type-writing machine, the track-rails, the type-carriage, a pair of oppositely-arranged axles supported by the carriage within the plane thereof and each carrying a pair of traveler-rollers respectively engaging the separate rails and adjustable bearing-supports for both terminals of each axle.

66. In a type-writing machine, the track-rails, the carriage, and a pair of parallel axles having adjustable terminal thrust-bearing supports and each carrying a pair of rollers traveling on the rails.

67. In a type-writing machine, the track-rails, the carriage, a pair of parallel axles arranged at opposite sides of the carriage and each carrying a pair of traveler-rollers traveling on the separate rails, and adjustable bearings for both ends of each shaft, one or both of said bearings comprising means for an endwise adjustment of the axles.

68. In a type-writing machine, a vertically-swinging type-bar carrier, a vertically-swinging support having pivotal connection with said carrier, counterbalancing means for the carrier and the parts carried thereby, and shifting mechanism for the carrier.

69. In a type-writing machine, a type-action frame, a vertically-swinging type-bar carrier and vertically-swinging supports arranged within the type-action frame and constituting the sole supporting and guiding means for the type-bar carrier said supports having pivotal connection with the carrier.

70. In a type-writing machine, a type-action frame, a vertically-swinging type-bar carrier, parallel synchronously-swinging supports mounted within the frame and constituting the sole supporting and guiding means for the type-bar carrier said supports having pivotal connection with the carrier.

71. In a type-writing machine, a type-action frame, a vertically-swinging type-bar carrier, and duplicate sets of parallel pivotally-mounted swinging supports arranged within the frame and constituting the sole supporting and guiding means for the carrier said supports having pivotal connection with the carrier.

72. In a type-writing machine, a type-action frame, a vertically-swinging type-bar carrier, and upper and lower duplicate sets of parallel hanger-arms pivotally connected with the carrier and having a pivotal support within said frame.

73. In a type-writing machine, the type-action frame, a vertically-swinging type-bar carrier, a plurality of rocking supports mounted within the frame and having synchronously-swinging pivotal connections with the type-bar carrier to constitute the sole guiding and supporting means therefor.

74. In a type-writing machine, a frame, a vertically-swinging type-bar carrier, a pair of rocking supports arranged one above the other within the frame, and synchronously-swinging hanger-arms carried by said supports and having pivotal connections with the type-bar carrier.

75. In a type-writing machine, a frame, a vertically-movable type-bar carrier, synchronously-swinging pivotal supports for said carrier, oppositely-arranged counterbalancing devices for the carrier and all parts supported thereby, and adjusting means for the counterbalancing devices and separate overbalancing means.

76. In a type-writing machine, a frame, a vertically-movable type-bar carrier, synchronously-swinging pivotal supports for said carrier, oppositely-arranged counterbalancing-springs for the type-bar carrier and the parts sustained thereby, one of said springs being adjustable and separate overbalancing means.

77. In a type-writing machine, a frame, a vertically-movable type-bar carrier, pivotal swinging supports for the said carrier, and oppositely-arranged counterbalancing-springs, one of said springs being of the coiled type and the other of the leaf type, and having adjusting means associated therewith.

78. In a type-writing machine, a frame, a vertically-movable type-bar carrier, a pair of rocking supports journaled in parallel relation in the frame, said supports carrying swinging hanger-arms pivotally connected with the carrier, a coiled counterbalancing-spring associated with one of the supports at one end, and a counterbalancing leaf-spring associated with said support at the opposite end and exerting a pressure thereon in the same direction as the coiled spring, said leaf-spring being attached to the frame and having an adjusting device associated therewith.

79. In a type-writing machine, a frame, a vertically-movable type-bar carrier, vertically-swinging pivotal supports for said carrier, counterbalancing-springs arranged to counterbalance the weight of the type-bar carrier and all parts sustained thereby, and a separate shifting device comprising means for overbalancing the type-bar carrier in either direction.

80. In a type-writing machine, a vertically-movable counterbalanced type-bar carrier, and a separate shifting mechanism having an overbalancing device shiftable to either of two positions for normally overbalancing the type-bar carrier in either an elevated or depressed position.

81. In a type-writing machine, a vertically-movable counterbalanced type-bar carrier, and a separate shifting mechanism having a single overbalancing device shiftable to either of two positions for normally overbalancing the type-bar carrier in either an elevated or depressed position.

82. In a type-writing machine, a vertically-movable counterbalanced type-bar carrier, and a separate shifting mechanism having an overbalancing-spring shiftable to either of two positions for normally overbalancing the type-bar carrier in either an elevated or depressed position.

83. In a type-writing machine, a vertically-movable counterbalanced type-bar carrier, and a shifting mechanism having an overbalancing-spring shiftable to either of two positions, and a shift-key having a greater leverage than said spring.

84. In a type-writing machine, a vertically-movable counterbalanced type-bar carrier and a shifting mechanism comprising a shiftable overbalancing device to overbalance the type-bar carrier in a depressed or elevated position, and also including a shift-key having a greater leverage than said overbalancing device.

85. In a type-writing machine, a vertically-movable counterbalanced type-bar carrier, and a separate shifting mechanism comprising a member having an operative connection with the carrier for raising and lowering the same, an overbalancing device having a shiftable connection with said member, and a shift-key also having a correspondingly-shiftable pull connection with the said member.

86. In a type-writing machine, a vertically-movable type-bar carrier, and shifting mechanism comprising a pivotally-supported member having an operative connection with said carrier, an overbalancing-spring having a shiftable connection with said member and movable to either side of the pivot thereof, and a shift-key having a correspondingly-shiftable pull connection with the said member.

87. In a type-writing machine, a vertically-movable type-bar carrier, and shifting mechanism comprising a pivotally-supported shift-lever having an operative connection with the type-bar carrier, an overbalancing-spring, a shift-key having a pull-rod connection, and a reversing device comprising means for simultaneously shifting one end of the overbalancing-spring and the pull-rod connection to either side of the pivot of said shift-lever.

88. In a type-writing machine, a vertically-movable counterbalanced type-bar carrier, and shifting mechanism comprising a pivotally-supported shift-lever connected with the type-bar carrier and having a cross-arm, an overbalancing-spring, a shift-key having a pull-rod connection, and a reversing device comprising means for shifting one end of the overbalancing-spring and the pull-rod connection upon the cross-arm to either side of the plane of the pivot for the shift-lever.

89. In a type-writing machine, a vertically-movable counterbalanced type-bar carrier, and shifting mechanism comprising a pivotally-supported shift-lever connected with the type-bar carrier and provided with a slotted reverse-head, an overbalancing-spring having a fixed support at one end, a shift-key having a pull-rod connection, and a reversing device having members connected respectively with the pull-rod connection and with the overbalancing-spring to effect a simultaneous shift thereof upon the reverse-head to either side of the pivot of the shift-lever.

90. In a type-writing machine, a vertically-movable counterbalanced type-bar carrier, and shifting mechanism comprising an oscillatory shift-lever pivotally supported at one end and having a connection at its other end with the type-bar carrier, said shift-lever being provided at its pivoted end with a cross-arm carrying an offset slotted reverse-head, an overbalancing-spring having a fixed support at one end, a shift-key having a pull-rod connection, and a reversing device having a pair of synchronously-operating links connected respectively with one end of the overbalancing-spring and the pull-rod connection, said links coöperating with the slot of the reverse-head and arranged to simultaneously shift the spring and the pull-rod connection to either side of the pivot for the shift-lever.

91. In a type-writing machine, a vertically-movable counterbalanced type-bar carrier, and shifting mechanism comprising an oscillatory shift-lever connected with the type-bar carrier and having a cross-arm, an overbalancing-spring shiftable at one end, a shift-key lever having a pull-rod connection, and a reversing device including a spindle carrying at one end a reverse-lever and a pair of adjusting-links pivotally connected with said reverse-lever at one end and at their other ends respectively with the shiftable ends of the overbalancing-spring and the pull-rod connection, one of said links being attached to the reverse-lever at a point farther from the spindle than the other link to provide a greater leverage for the shift-key than the overbalancing-spring.

92. In a type-writing machine, a vertically-movable counterbalanced type-bar carrier, an oscillatory shift-lever pivotally supported at one end and having its other end connected with the type-bar carrier, an overbalancing-spring having an adjustable support at one end, a shift-key lever, a pull-rod connection with said shift-key lever, and a reversing device comprising means for simultaneously shifting one end of the spring and the pull-rod connection to either side of the pivotal support for the shift-lever.

93. In a type-writing machine, the combination with the type-bar-hanger support and the type-bars, of the type-bar hangers, each having parallel bearing-cheeks to receive the journals of the type-bars, a pair of adjusting-plates associated with each type-bar hanger and extending transversely across the upper and lower edges thereof, said adjusting-plates, under stress, exerting a contracting action upon the hanger, and a common adjusting-screw connecting the two plates.

94. In a type-writing machine, the combination with the type-bar-hanger support and the type-bars, of the type-bar hangers each having parallel bearing-cheeks and adjacent to said cheeks being provided at both their upper and lower edges with wedge bevels, a pair of adjusting-plates having wedge lugs coöperating with the bevels of the hangers, and a common adjusting-screw connecting each pair of adjusting-plates.

95. In a type-writing machine, the carriage-casing, a single detachable type-action frame carrying the entire type-action and the key-action for the latter, said key-action including a plurality of key-levers pivotally supported upon the front side of the type-action frame and carrying the keys of the keyboard, each of said levers having a pull-rod connection with a type-bar.

96. In a type-writing machine, the carriage-casing, a single detachable type-action frame supporting the entire type-action and the key-action for the latter, said key-action including a plurality of vertically-arranged bell-crank key-levers mounted upon the front wall of the type-action frame and carrying the keys of the keyboard, each of said levers having a pull-rod connection with a type-bar.

97. In a type-writing machine, the carriage-casing, a single detachable type-action frame supporting the entire type-action and the key-action for the latter, said key-action including vertically-movable bell-crank levers pivotally supported at their angles upon the front wall of said frame, said levers being arranged in rows of progressively different sizes to provide for the stepped arrangement of the keys of the keyboard, and each lever having a pull-rod connection with a type-bar.

98. In a type-writing machine, the carriage-casing having a front open keyboard extension, a separate detachable type-action frame, carrying the entire type-action, and a series of key-levers pivotally supported upon the front wall of the type-action frame and carrying the keys of the keyboard, all of said levers and their keys being disposed inside of the keyboard extension of the carriage-casing, and each lever having an operative connection with a type-bar.

99. In a type-writing machine, the carriage, a single detachable type-action frame carrying the entire type-action, a plurality of vertically-arranged bell-crank key-levers pivotally mounted at the front of the type-action frame, said key-levers being arranged in rows of progressively different sizes but having their upstanding arms projecting to a common horizontal plane and having duplicate pull-rod connections with the type-bars, a letter-spacing mechanism, and a common universal bar also mounted at the front of the type-action frame and associated with the upstanding arms of the key-levers and operatively related to the letter-spacing mechanism.

100. In a type-writing machine, the carriage having a detachable bottom plate carrying letter-spacing mechanism and a motion-transmitting element operatively related thereto, and a single detachable type-action-supporting frame carrying the entire type-action, and a universal bar having a separable operative connection with the motion-transmitting element.

101. In a type-writing machine, the carriage-casing, letter-spacing mechanism mounted within the carriage-casing, a motion-transmitting element also mounted within the carriage-casing and operatively connected with the letter-spacing mechanism, a single detachable type-action-supporting frame removable from the carriage-casing and the elements associated with the letter-spacing mechanism, said frame carrying the entire type-action including a plurality of key-levers and a common universal bar acted upon directly by said levers and having a separable operative connection with the motion-transmitting element.

102. In a type-writing machine, the type-carriage casing, the letter-spacing mechanism therefor, a motion-transmitting element connected with the letter-spacing mechanism, a detachable type-action frame removable from the casing and the elements associated with the letter-spacing mechanism, and the type-action carried by said frame and including a plurality of key-levers and a common universal bar acted directly upon by all of said levers and having a separable interlocking connection with the motion-transmitting element.

103. In a type-writing machine, the type-carriage, letter-spacing mechanism therefor, a motion-transmitting element operatively connected with the letter-spacing mechanism, the type-action detachable as an entirety from the letter-spacing mechanism and the motion-transmitting element, said type-action including a plurality of key-levers having arms extending to a common plane, and a common universal bar acted directly upon by said arms of the levers and having a separable interlocking connection with the motion-transmitting element.

104. In a type-writing machine, the carriage, letter-spacing mechanism therefor, a motion-transmitting element operatively connected with the letter-spacing mechanism, and the type-action detachable as an entirety from the letter-spacing mechanism and the motion-transmitting element, said type-action including a series of bell-crank key-levers having upstanding arms projecting to a common plane, and a common universal bar arranged at one side of said upstanding arms and having an operative separable connection with the motion-transmitting element.

105. In a type-writing machine, the carriage, the letter-spacing mechanism therefor, a motion-transmitting element connected with said letter-spacing mechanism, said motion-transmitting element carrying a yoke-lever, and the type-action including a series of key-levers having arms arranged in an alined row, a common universal bar arranged at one side of said row of arms, and coupling-latches pivotally connected with the universal bar and having detachable hook connections with the yoke-lever.

106. In a type-writing machine, the carriage, the letter-spacing mechanism therefor, a motion-transmitting element carrying an upstanding yoke-lever having a horizontal yoke-bar, said motion-transmitting element being connected with the letter-spacing mechanism, the type-action including bell-crank key-levers having their upstanding arms arranged in a row, a common universal bar having pendent swinging supports, and coupling-latches pivotally connected with the universal bar and provided at one end with hooks detachably connecting the horizontal bar of the yoke-lever.

107. In a type-writing machine, the carriage, the letter-spacing mechanism therefor, a motion-transmitting element connected with the letter-spacing mechanism, the type-action having key-levers with upstanding arms, a common universal bar engaged by said arms and having pendent swinging supports, and a space-key yoke-lever having its end bars pivotally supported and provided with members engaging the pendent supports of the universal bar.

108. In a type-writing machine, the carriage, the letter-spacing mechanism therefor, a motion-transmitting element connected with the letter-spacing mechanism, the type-action having key-levers with upstanding arms, a common universal bar engaged by said arms and having pendent swinging supports, and a space-key yoke-lever extending around the keyboard and having end bars pivotally supported and provided with inturned lugs engaging the pendent supports of the universal bar, and an auxiliary return-spring having a fixed support and engaging a part of said space-key yoke-lever.

109. In a type-writing machine, the carriage having a detachable bottom plate, a detachable type-action-supporting frame carrying the entire type-action, and the letter-spacing mechanism carried as an entirety by a base-plate detachably fitted to the bottom plate of the carriage.

110. In a type-writing machine, the track-carrier, a scaled trip-holding bar rigidly mounted upon the track-carrier and separate from the track-rails, the traveling carriage, and a line-lock device having normally inactive elements and comprising means for locking the type-action and all coöperating parts, said line-lock device including a trip adjustably fitted to the scaled holding-bar, and locking elements carried by the carriage and set into active positions by said trip.

111. In a type-writing machine, the track-carrier, a trip-holding bar mounted upon the carrier separate from the track-rails, said trip-holding bar being graduated and provided with a series of catch elements, and a line-lock device having normally inactive locking elements carried by the carriage, and also having a trip slidable upon the holding-bar and having a catch device engaging the catch elements of the bar.

112. In a type-writing machine, the combination with the carriage, of a line-lock device comprising means for locking the type-action and all coöperating parts, said line-lock device including a release-key disposed within the area of the keyboard, said release-key constituting a direct extension of the locking element of said line-lock device.

113. In a type-writing machine, the carriage, a line-lock device including a tripping lock-lever constituting the main locking element and comprising means for locking the entire type-action and all coöperating parts, and a release-key consisting of a lever-arm rigid with said lock-lever and extended forwardly into the keyboard, said release-key being arranged to provide for resetting the line-lock device and releasing it from the printing mechanism upon the depression of the key.

114. In a type-writing machine, the combination with the type-bars having a plurality of faces, the key-levers and the connections between these elements, of a vertically-swinging type-bar carrier supported to swing through the arc of a circle to points equidistant above and below the horizontal plane of its axis or axes, whereby there is no disturbance in position at the point of connection between the key-levers and the elements for transmitting motion therefrom to the type-bars.

115. In a type-writing machine, the combination of the carriage-casing carrying the letter-spacing mechanism, a detachable type-action frame carrying the universal bar having a separable operative connection with the letter-spacing mechanism, a type-bar carrier supported by the type-action frame and carrying the type-bars, and a plurality of vertically-arranged bell-crank key-levers supported upon the frame, said levers being arranged in rows of progressively different sizes and having the proportion between the lengths of the key ends and the upstanding ends of each set of levers relatively maintained so that the leverage of all sets is the same and the dip of the keys is the same.

116. In a type-writing machine, a main support, a rising and falling guide-frame supporting thereon the printing mechanism and its related parts and interposed between that mechanism and the writing plane, and means for bodily raising and lowering said guide-frame from and to the work while the latter is in position for printing and without disturbing the same.

In testimony whereof we affix our signatures in presence of two witnesses.

HARRY S. DUKES.
WILLIAM H. CLAYTON.

Witnesses:
PALMER DANAHER,
J. F. WILLS.